United States Patent
Yamamoto

(10) Patent No.: US 10,628,139 B2
(45) Date of Patent: Apr. 21, 2020

(54) ANALYSIS APPARATUS, ANALYSIS METHOD AND RECORDING MEDIUM ON WHICH ANALYSIS PROGRAM IS RECORDED

(71) Applicant: FUJITSU LIMITED, Kawasaki-shi, Kanagawa (JP)

(72) Inventor: Koji Yamamoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/003,693

(22) Filed: Jun. 8, 2018

(65) Prior Publication Data

US 2018/0364992 A1 Dec. 20, 2018

(30) Foreign Application Priority Data

Jun. 14, 2017 (JP) .................. 2017-117277

(51) Int. Cl.
G06F 8/41 (2018.01)
G06F 8/658 (2018.01)
G06F 16/901 (2019.01)
G06F 8/75 (2018.01)

(52) U.S. Cl.
CPC .............. *G06F 8/427* (2013.01); *G06F 8/658* (2018.02); *G06F 8/751* (2013.01); *G06F 16/9014* (2019.01); *G06F 16/9024* (2019.01)

(58) Field of Classification Search
CPC ...... G06F 8/41–44; G06F 8/447; G06F 8/658; G06F 8/751; G06F 16/9014; G06F 16/9024
USPC .................. 717/140–144, 155, 156
See application file for complete search history.

(56) References Cited

U.S. PATENT DOCUMENTS

| | | | |
|---|---|---|---|
| 5,673,387 A | 9/1997 | Chen et al. | |
| 6,594,822 B1* | 7/2003 | Schweitz | G06F 8/71 |
| | | | 717/140 |
| 7,503,027 B1* | 3/2009 | Zhao | G01R 31/31726 |
| | | | 716/104 |

(Continued)

FOREIGN PATENT DOCUMENTS

| | | |
|---|---|---|
| JP | 08-044590 | 2/1996 |
| JP | 2014-010699 | 1/2014 |
| JP | 2014-126985 | 7/2014 |

OTHER PUBLICATIONS

Higo, Y., et al., Code Clone Detection on Specialized PDGs with Heuristics, 15th European Conference on Software Maintenance and Reengineering, 2011, pp. 75-84, [retrieved on May 22, 2019], Retrieved from the Internet.*

(Continued)

*Primary Examiner* — Geoffrey R St Leger
(74) *Attorney, Agent, or Firm* — Fujitsu Patent Center

(57) ABSTRACT

An analysis apparatus, includes: a memory; and a processor coupled to the memory, wherein the processor: acquires two source codes of a comparison target; generates two abstract syntax trees of the two source codes by analyzing the two source codes; graphs, based on the two abstract syntax trees, a flow of processing and a flow of data in methods and between methods in the two source codes, reduces, based on a given rule, one or more redundant portions of the respective graphs of the two graphed source codes; and compares the two reduced graphs and outputs a difference between the two source codes.

15 Claims, 27 Drawing Sheets

(56) References Cited

U.S. PATENT DOCUMENTS

| | | | | |
|---|---|---|---|---|
| 8,181,171 B2* | 5/2012 | Ito | ................... | G06F 11/3604 |
| | | | | 717/144 |
| 8,984,485 B2* | 3/2015 | Elshishiny | .......... | G06F 11/3676 |
| | | | | 717/124 |
| 9,043,757 B2* | 5/2015 | Tiwari | ................... | G06F 8/31 |
| | | | | 717/122 |
| 9,294,281 B2* | 3/2016 | Schechter | ............... | G06F 21/31 |
| 9,760,346 B2* | 9/2017 | Villadsen | ................ | G06F 8/41 |
| 2005/0204344 A1* | 9/2005 | Shinomi | ................ | G06F 8/316 |
| | | | | 717/124 |
| 2005/0262491 A1* | 11/2005 | Gu | ................... | G06F 8/4443 |
| | | | | 717/151 |
| 2009/0007087 A1* | 1/2009 | Ito | ................... | G06F 11/3604 |
| | | | | 717/156 |
| 2009/0287641 A1* | 11/2009 | Rahm | ................... | G06F 16/951 |
| 2010/0131515 A1* | 5/2010 | Canright | ............... | G06F 16/951 |
| | | | | 707/742 |
| 2013/0212385 A1* | 8/2013 | Schechter | ............... | G06F 21/31 |
| | | | | 713/168 |
| 2014/0053285 A1* | 2/2014 | Asadullah | ............... | G06F 21/10 |
| | | | | 726/32 |
| 2014/0331202 A1* | 11/2014 | Fukuda | ................... | G06F 8/75 |
| | | | | 717/123 |

OTHER PUBLICATIONS

Cui, B., et al., Code Comparison System based on Abstract Syntax Tree, 3rd IEEE International Conference on Broadband Network and Multimedia Technology (IC-BNMT), Oct. 26-28, 2010, pp. 668-673, [retrieved on May 21, 2019], Retrieved from the Internet.*

* cited by examiner

FIG. 4

| ID | STORAGE POSITION | NODE TYPE | CLASS | ATTRIBUTE |
|----|------------------|-----------|-------|-----------|
| 11 | /src/rev.1/ | 1 | D | REQUEST |
| 12 | /src/rev.1/ | 2 | | 1 |
| 13 | /src/rev.1/ | 3 | | -1 |
| 14 | /src/rev.1/ | 1 | BN | |

FIG. 5

| STARTING POINT ID | ENDING POINT ID |
|---|---|
| 11 | 12 |
| 12 | 16 |
| 16 | 14 |
| 14 | 15 |

FIG. 6

| NAME | CONTENTS |
|---|---|
| D | DEFINITION OF PROCESS CONTENTS OF METHOD (Method Definition) |
| C | CALL OF METHOD (Method Call) |
| BN | ENTERING INTO (NESTED) BLOCK REGION (Block Enter) |
| BX | EXITING FROM (NESTED) BLOCK REGION (Block Exit) |
| IV | IMMEDIATE VALUE (Immediate Value) |
| ID | FUNCTION THAT OUTPUTS INPUTTED VALUE AS IT IS (Identity function) |
| DL | DECLARATION OF LOCAL VARIABLE (Declaration of Local variable) |
| WL | SETTING OF VALUE OF LOCAL VARIABLE (Writing value to Local variable) |
| RL | REFERENCE TO VALUE OF LOCAL VARIABLE (Retrieving value to Local variable) |

ANALYSIS APPARATUS, ANALYSIS METHOD AND RECORDING MEDIUM ON WHICH ANALYSIS PROGRAM IS RECORDED

CROSS-REFERENCE TO RELATED APPLICATION

This application is based upon and claims the benefit of priority of the prior Japanese Patent Application No. 2017-117277, filed on Jun. 14, 2017, the entire contents of which are incorporated herein by reference.

FIELD

The embodiment discussed herein is related to an analysis apparatus, an analysis method and a recording medium on which an analysis program is recorded.

BACKGROUND

An analysis apparatus analyzes source codes before and after change in order to compare the equalities in behavior of a program when update of the program is performed in software development and so forth.

For example, in an analysis of a source code, character strings of the source code before and after change are compared with each other for each fixed unit, and the equality of the two source codes is decided based on a result of the comparison.

Examples of the related art include Japanese Laid-Open Patent Publication No. 2014-10699.

SUMMARY

According to an aspect of the embodiments, an analysis apparatus, includes: a memory; and a processor coupled to the memory, wherein the processor: acquires two source codes of a comparison target; generates two abstract syntax trees of the two source codes by analyzing the two source codes; graphs, based on the two abstract syntax trees, a flow of processing and a flow of data in methods and between methods in the two source codes, reduces, based on a given rule, one or more redundant portions of the respective graphs of the two graphed source codes; and compares the two reduced graphs and outputs a difference between the two source codes.

This object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4 to 6 illustrate different examples of a tripartite graph table.

DESCRIPTION OF EMBODIMENT

Figure 1:
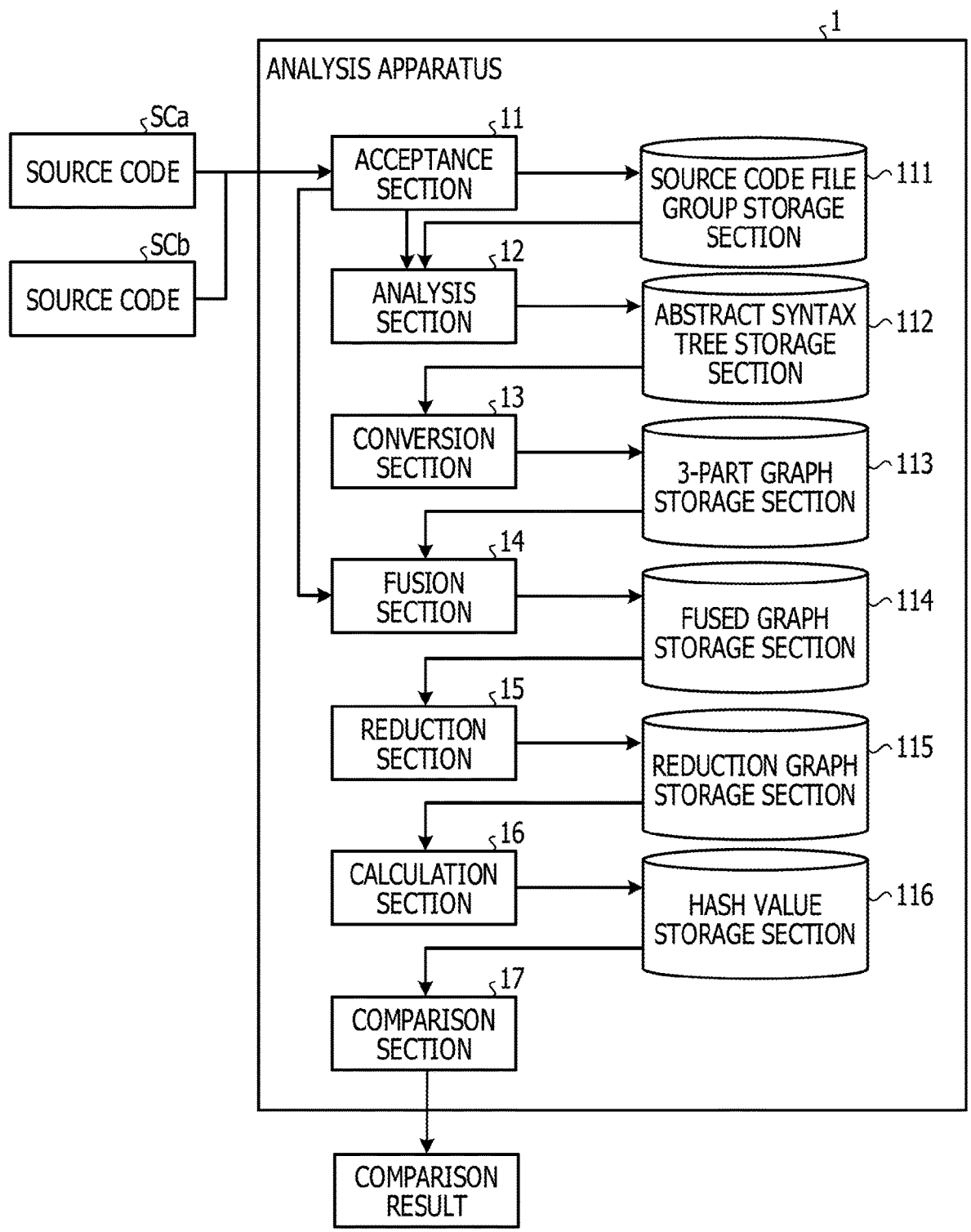
FIG. 1 illustrates an example of functional blocks of an analysis apparatus.

FIG. 1 illustrates an example of functional blocks of an analysis apparatus. As illustrated in FIG. 1, the analysis apparatus 1 includes an acceptance section 11, an analysis section 12, a conversion section 13, a fusion section 14, a reduction section 15, a calculation section 16 and a comparison section 17. The analysis apparatus 1 further includes a source code file group storage section 111, an abstract syntax tree storage section 112, a tripartite graph storage section 113, a fused graph storage section 114, a reduction graph storage section 115 and a hash value storage section 116.

The acceptance section 11 accepts two source codes SCa and SCb that serve as a target of comparison and stores the two source codes SCa and SCb into the source code file group storage section 111. The source codes SCa and SCb are text files written in accordance with language specifications of a programming language such as Java (registered trademark) or the C language. In the following description, the source codes SCa and SCb in Java are described as an example.

As a relationship between the two source codes SCa and SCb, for example, the two source codes SCa and SCb are source codes different in revision. For example, the two source codes SCa and SCb are source codes before and after refactoring. It is to be noted that the two source codes SCa and SCb are sometimes referred to collectively as source code SC.

The analysis section 12 acquires the two source codes SCa and SCb of the comparison target, analyzes the source codes SCa and SCb individually and stores a result of the analysis into the abstract syntax tree storage section 112. The analysis section 12 may acquire the two source codes SCa and SCb directly from the acceptance section 11 or may acquire from the source code file group storage section 111. Here, an analysis process of the analysis section 12 is described particularly with reference to FIG. 2.

Figure 2:
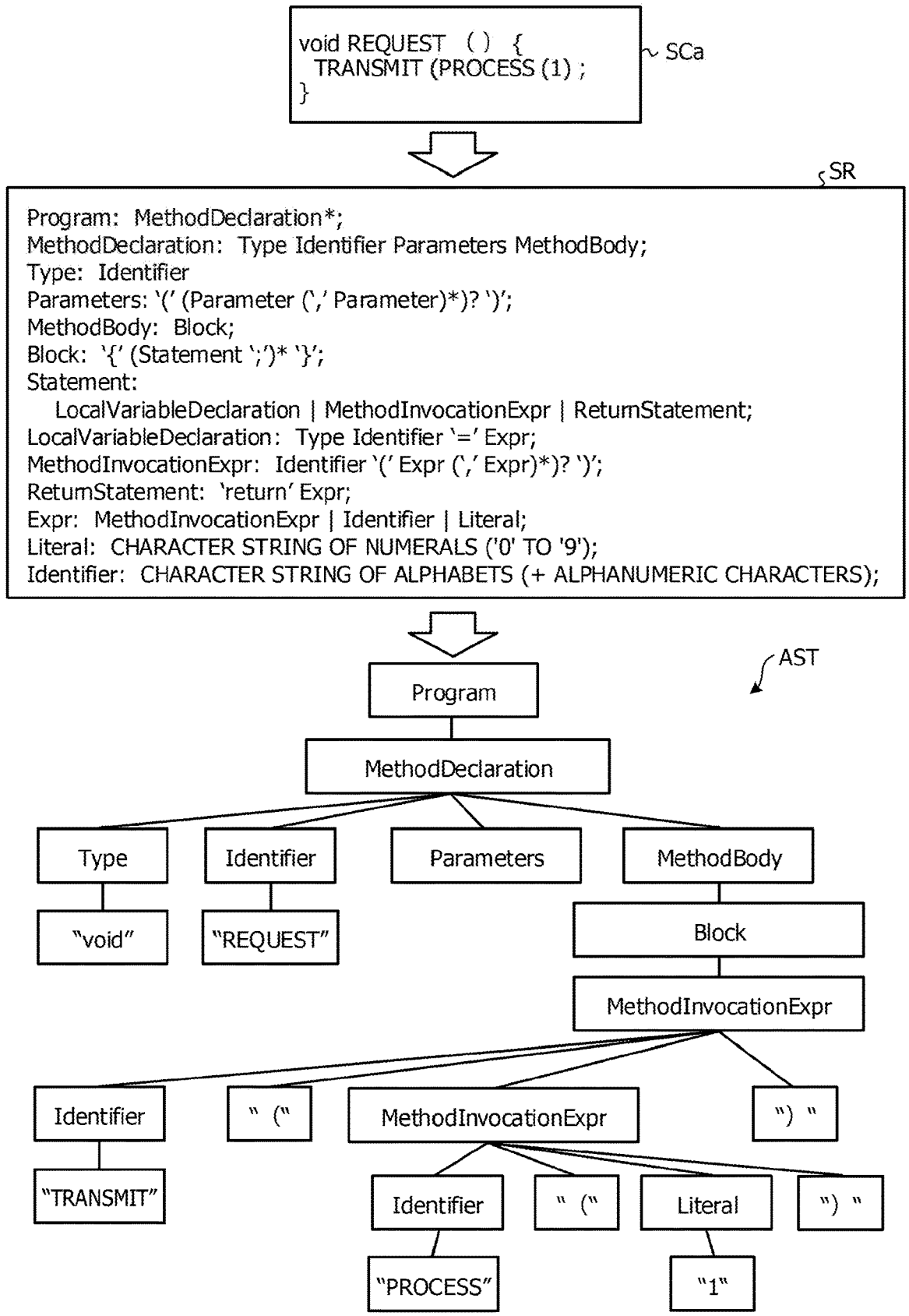
FIG. 2 illustrates an example of an analysis process.

FIG. 2 illustrates an example of an analysis process. In FIG. 2, the source code SCa in Java and a syntax rule SR of Java are illustrated. As illustrated in FIG. 2, the analysis section 12 analyzes the source code SC in accordance with the syntax rule SR to generate an abstract syntax tree AST. In FIG. 2, only main components of the abstract syntax tree AST are illustrated. In FIG. 2, the source code SCa from between the two source codes SCa and SCb of the comparison target is illustrated, and the other source code SCb is hereinafter described with reference to FIG. 7.

The source code SC and the syntax rule SR illustrated in FIG. 2 are an example, and the source code and the syntax rule are not limited to them and may be a more complicated source code SC or other syntax rule SR.

The conversion section 13 illustrated in FIG. 1 graphs flows of processes and flows of data in methods and between methods in the two source codes SCa and SCb based on the generated abstract syntax trees ASTs. The conversion section 13 acquires the abstract syntax trees ASTs, for example, from the abstract syntax tree storage section 112 and stores data of the generated graphs into the tripartite graph storage section 113.

Figure 3:
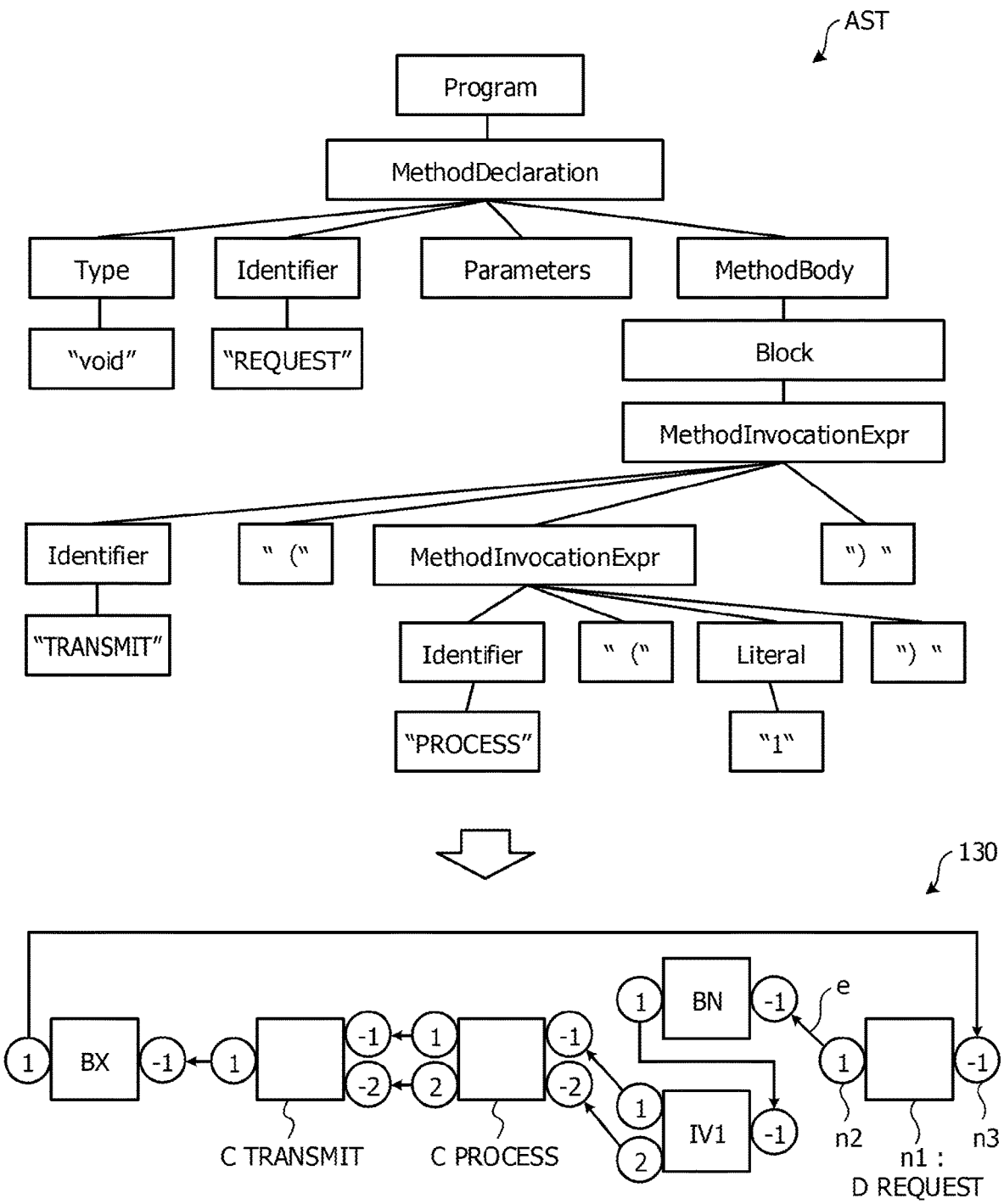
FIG. 3 illustrates an example of a conversion process.

FIG. 3 illustrates an example of a conversion process. As illustrated in FIG. 3, the conversion section 13 converts each generated abstract syntax tree AST into a tripartite graph 130.

The tripartite graph 130 includes first nodes n1 (each hereinafter referred to sometimes as main node n1), second nodes n2 (each hereinafter referred to sometimes as terminal n2), third nodes n3 (each hereinafter referred to sometimes as terminal n3), and edges e.

The first nodes n1 correspond to processes in methods or between methods of the source code SC. It is to be noted that, in FIG. 3, each main node n1 is indicated by a rectangle, in which a class is indicated.

The second nodes n2 correspond to reference to data in the source code SC. To each second node n2, a return value of method call, a reference value of a local variable, a value of a parameter passed in a definition of contents of a method process, an environment after the process is performed and so forth are set. In FIG. 3, each second node n2 is indicated by a circle, in which a positive value "1" or "2" is indicated. The positive value "1" indicates the environment, and the positive value "2" indicates the parameter.

The third nodes n3 correspond to setting or update of data in the source code SC. To each third node n3, a value of a parameter to be passed upon method call, a set value of a local variable, a return value that is returned as a result of execution of contents of a process of a defined method, an environment after an immediately preceding process is performed and so forth are set. In FIG. 3, each third node n3 is indicated by a circle, in which a negative value "−1" or "−2" is indicated. The negative value "−1" indicates the environment, and the negative value "−2" indicates the parameter.

The edges e indicate execution orders of processes. In FIG. 3, each edge e is indicated by an arrow mark. For example, an edge e connects the terminal n2 of a given main node n1 (for example, "D request" illustrated in FIG. 3) with the terminal n3 of a main node n1 (for example, "BN" illustrated in FIG. 3) to be executed next to the main node n1 to each other. Further, though not illustrated, an edge e connects a main node n1 with each of the terminals n2 and n3.

By the conversion into the tripartite graph 130 in this manner, the two source codes SCa and SCb are compared with each other under the unified conditions, and therefore, the accuracy when a difference is detected from between comparison results is improved.

The conversion section 13 stores information of the converted tripartite graph 130 into the tripartite graph storage section 113.

FIGS. 4 to 6 illustrate different examples of a tripartite graph table. In FIGS. 4 to 6, a tripartite graph table indicative of a data structure of the tripartite graph 130 stored in the tripartite graph storage section 113 is illustrated. In FIG. 4, a node table indicative of information of the first to third nodes n1 to n3 is illustrated. In FIG. 5, an edge table indicative of information of the edges e is illustrated. In FIG. 6, a class table indicative of information regarding the class of a first node n1 is illustrated.

As illustrated in FIG. 4, the node table includes items of "ID," "storage position," "node type," "class" and "attribute." The "ID" indicates identification information for identifying a node. The "storage position" indicates a position at which a corresponding source code SC is stored. The "node type" indicates which one of the first to third nodes n1 to n3 the node is. The "class" indicates a class of the first node n1. The "attribute" indicates an attribute of data.

For example, as illustrated in FIG. 4, the node whose ID is "11" is the first node n1, and the class and the attribute of the node are "D" and "request," respectively. Further, the source code SC corresponding to the node whose ID is "1" is stored at "/src/rev.1/."

As illustrated in FIG. 5, the edge table includes such items as "starting point ID" and "ending point ID." The "starting point ID" is identification information for identifying a node that becomes a starting point of an edge e (refer to FIG. 3). The "ending point ID" is identification information for identifying a node that becomes an ending point of the edge e (refer to FIG. 3).

For example, the edge e whose starting point ID is "11" and whose ending point ID is "12" is an edge that connects a main node n1 with a terminal n2.

As illustrated in FIG. 6, the class table includes such items as "name" and "contents." The "name" indicates a name of each main node n1. The "contents" indicates contents of a process of the main node n1 of each name.

For example, it is indicated that the process contents of the main node n1 whose name is "D" is "definition of process contents of the method (Method Definition)." For example, the "D request" illustrated in FIG. 3 indicates that the process contents is "request."

The fusion section 14 illustrated in FIG. 1 fuses partial graphs of each graph (each tripartite graphs 130) of the two source codes SCa and SCb graphed by the conversion section 13 to generate a partial graph of a definition of a given method. The acceptance section 11 accepts a designation of a definition of a method from a user, and then the fusion section 14 generates a partial graph of the designated definition of the method.

Figure 7:
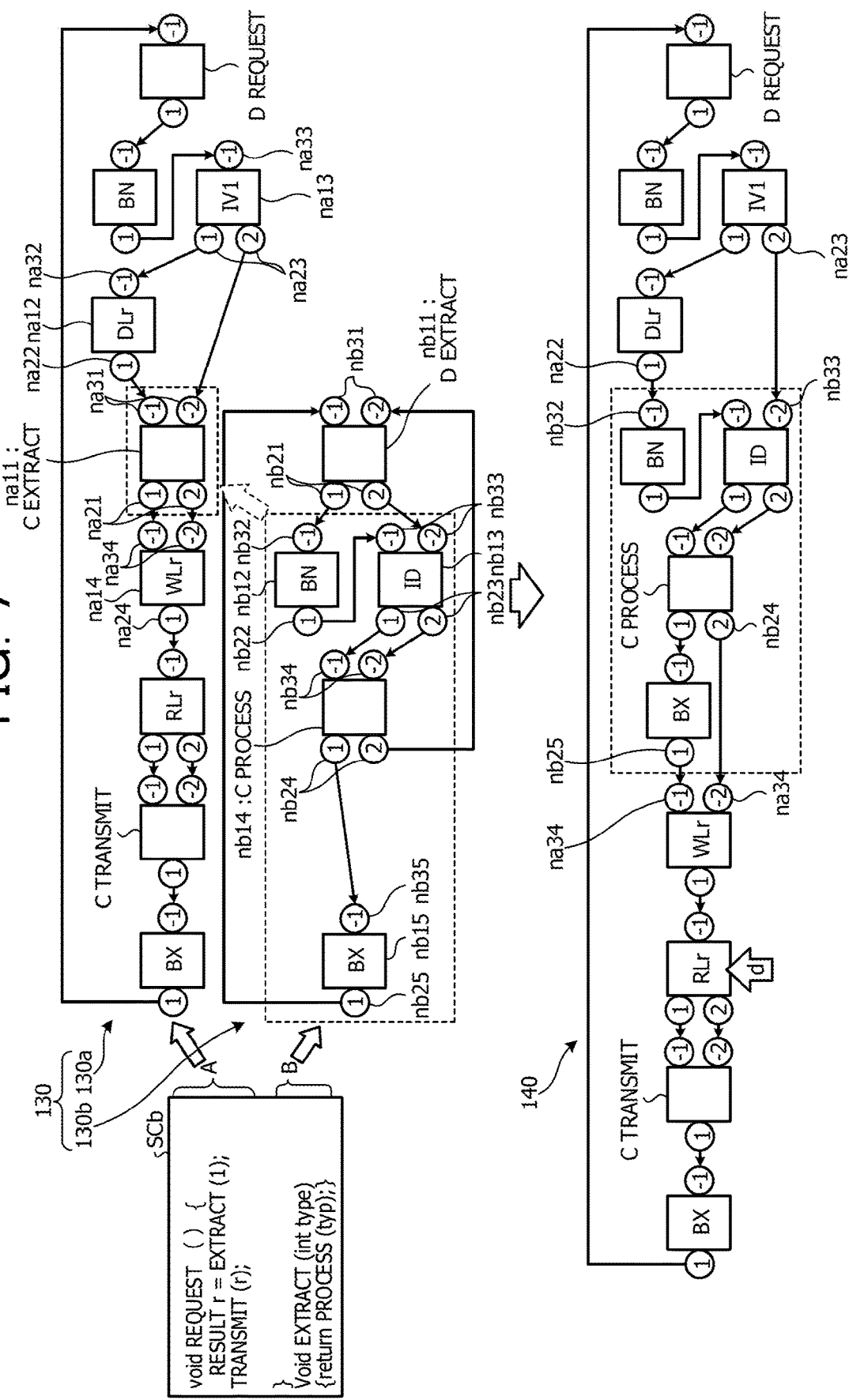
FIG. 7 illustrates an example of a fusion process.

FIG. 7 illustrates an example of a fusion process. In FIG. 7, the source code SCb and a tripartite graph 130 generated by conversion of the source code SCb are illustrated.

As illustrated in FIG. 7, the tripartite graph 130 includes a partial graph 130a and another partial graph 130b. The partial graph 130a is a graph indicative of a method A in the source code SCb, and the partial graph 130b is a graph indicative of a method B in the source code SCb.

The fusion section 14 fuses the partial graph 130a and the partial graph 130b in regard to the definition of the method A to generate a fused graph 140. For example, the fusion section 14 replaces "C extract," which is the main node n1 of the partial graph 130a, with the partial graph 130b.

For example, the fusion section 14 deletes "C extract" that is the main node na11 of the partial graph 130a and corresponding terminals na21 and na31 and "D extract" that is the main node nb11 of the partial graph 130b and corresponding terminals nb21 and nb31.

The fusion section 14 connects the terminal na22 of "DLr" that is the main node na12 of the partial graph 130a with the terminal nb32 of "BN" that is the main node nb12 of the partial graph 130b to each other.

The fusion section 14 connects "2" of the terminal na23 of "IV1" that is the main node na13 of the partial graph 130a with "−2" of the terminal nb33 of "ID" that is the main node nb13 of the partial graph 130b to each other.

The fusion section 14 connects "−2" of the terminal na34 of "WLr" that is the main node na14 of the partial graph 130a with "2" of the terminal nb24 of "C process" that is the main node nb14 of the partial graph 130b to each other.

The fusion section 14 connects "−1" of the terminal na34 of "WLr" that is the main node na14 of the partial graph 130a with the terminal nb25 of "BX" that is the main node nb15 of the partial graph 130b to each other to complete a fused graph 140 in which the partial graphs 130a and 130b are fused to each other.

By fusion the partial graphs 130a and 130b in regard to the noticed method A to each other in this manner, comparison between the two source codes SCa and SCb may be performed readily.

The reduction section 15 illustrated in FIG. 1 reduces redundant portions of each graph (tripartite graph 130 or fused graph 140) in the two graphed source codes SCa and SCb in accordance with a given rule.

Figure 8:
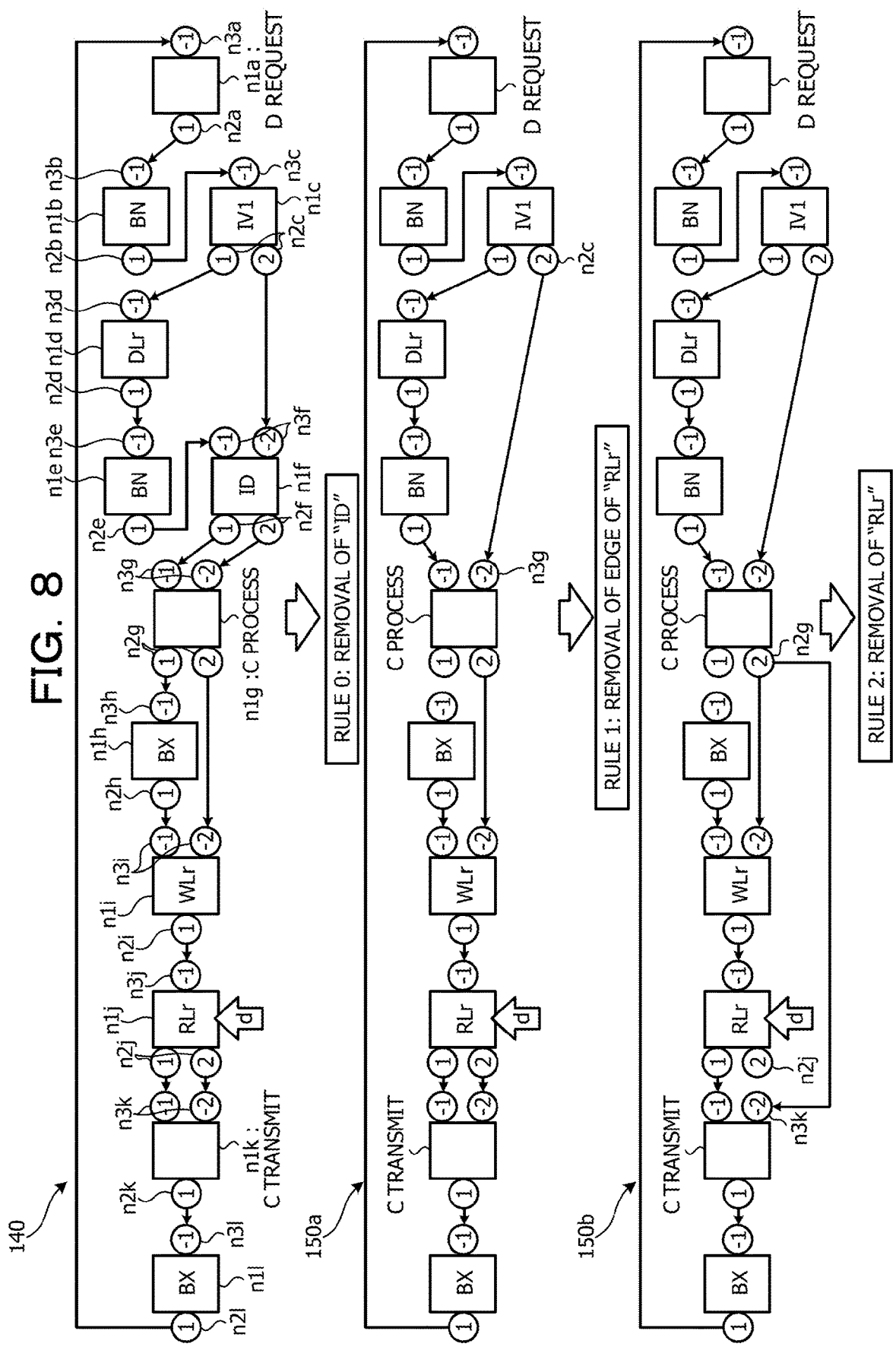
FIGS. 8 to 10 illustrate an example of a reduction process.
Figure 9:
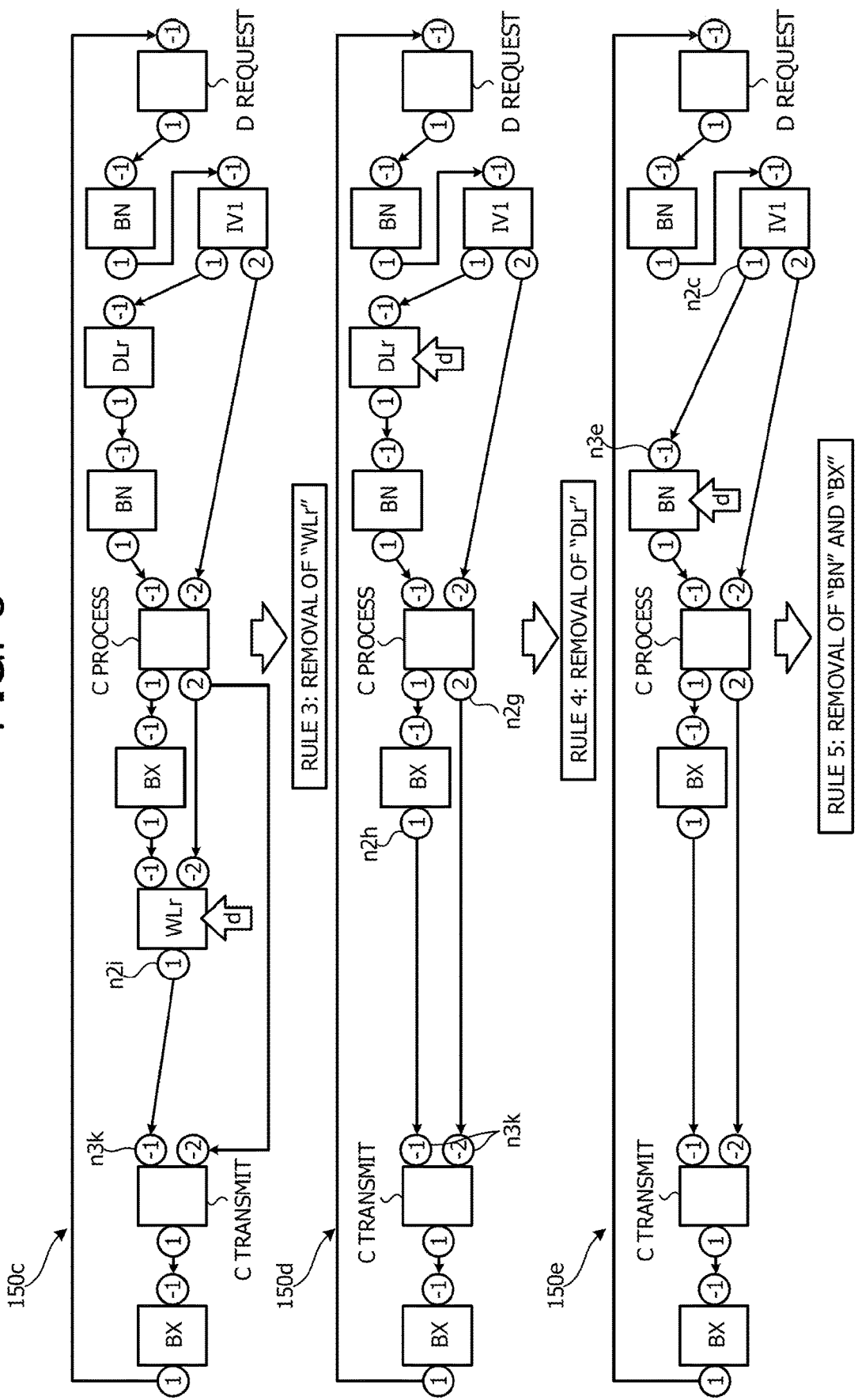
Figure 10:
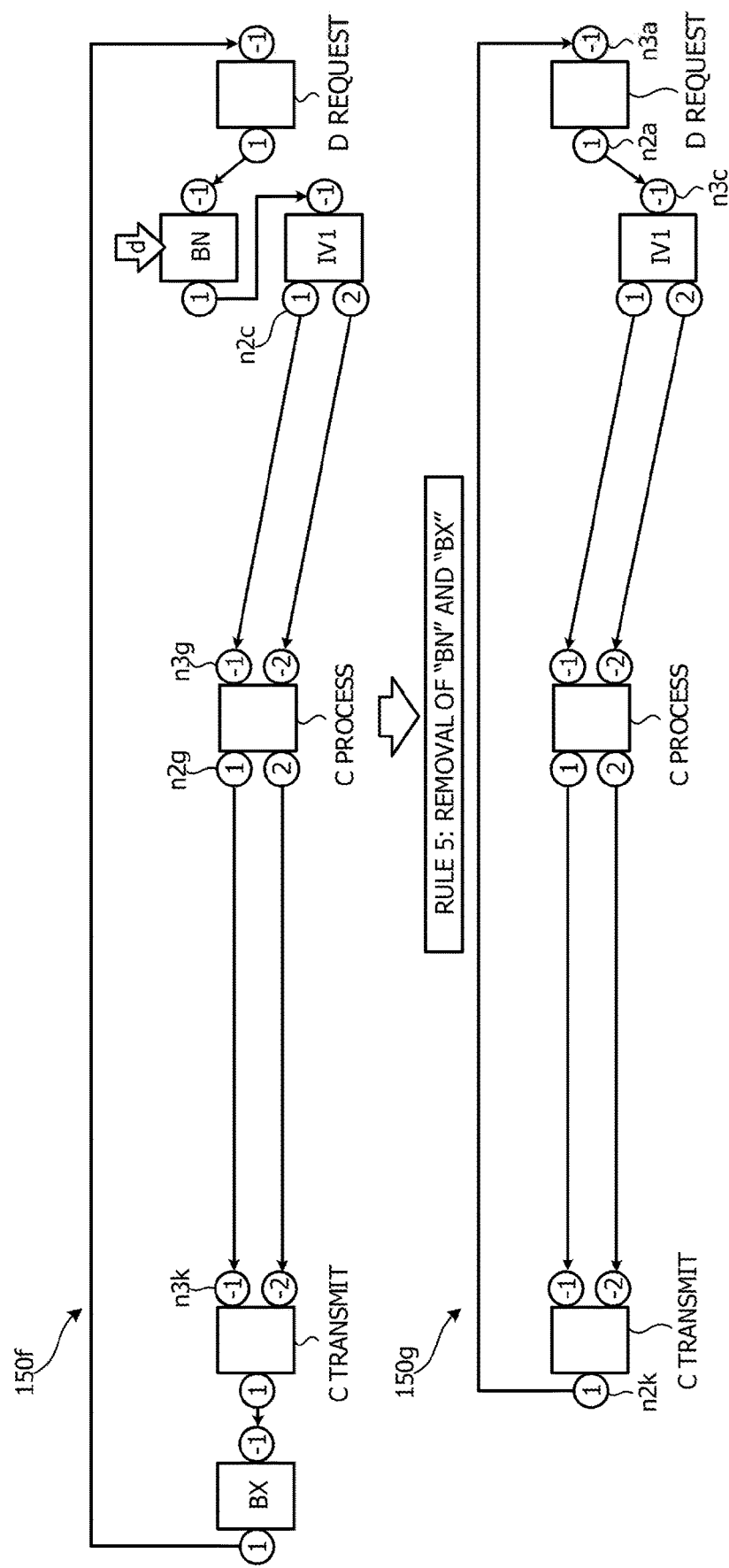

FIGS. 8 to 10 illustrate an example of a reduction process. In FIGS. 8 to 10, a reduction process of the reduction section 15 for the fused graph 140 generated by the fusion section 14 is illustrated. The reduction process may be performed for the tripartite graph 130 or the partial graphs 130a and 130b in addition to the fused graph 140.

As illustrated in FIGS. 8 to 10, the reduction section 15 performs the reduction process in accordance with given rules 0 to 5. For example, the reduction section 15 applies the rule 0 to the fused graph 140 to remove the "ID" that is the main node n1f and the corresponding terminals n2f and n3f. The rule 0 is free from a condition for application, and processing is performed normally.

At this time, the reduction section 15 connects "2" of the terminal n2c of "IV1" of the main node n1c with "−2" of the terminal n3g of "C process" that is the main node n1g to each other. Consequently, the reduction section 15 generates a reduction graph 150a to which the rule 0 is applied.

The reduction section 15 applies the rule 1 to the reduction graph 150a to remove the edge that connects the terminals n2j of "RLr" that is the main node n1j with the terminals n3k of "C transmit" that is the main node n1k to each other.

The application condition of the rule 1 is that, in a path from "WLr" that is the main node n1i to "RLr" (RL(−1)←(1)fn, . . . , f1(−1)←(1)WL), a path exists from a path "WLr (attribute is r)" in which, where the attribute of "RLr" is r and "BN" and "BX" on the outermost side among pairs from among f1, . . . , fn are represented by f_{kN} and f_{kX}, ∀i=1, . . . , kN, kX, . . . , n:fi is none of "WLr," "DLr" and "D," to "RLr" that is the target main node n1j. It is to be noted that a path stands for a sequence of edges (path fn, . . . , f1) that traverses nodes from f1 to fn where f1, . . . , fn are main nodes.

At this time, the reduction section 15 connects the terminal n2g of "C process" that is the main node n1g with the terminal n3k of "C transmit" that is the main node n1k. The reduction section 15 thereby generates a reduction graph 150b to which the rule 1 is applied.

The reduction section 15 applies the rule 2 to the reduction graph 150b to remove "RLr" that is the main node n1j and corresponding terminals n2f and n3f. The application condition of the rule 2 is that there is no edge that goes out from the terminal n2j (terminal indicated by a circle in which "2" is written) of "RLr" that is the main node n1j.

At this time, the reduction section 15 connects the terminal n2i of "WLr" that is the main node n1i with a terminal n3k of "C transmit" that is the main node n1k. The reduction section 15 thereby generates a reduction graph 150c to which the rule 2 is applied.

The reduction section 15 applies the rule 3 to the reduction graph 150c to remove "WLr" that is the main node n1i and corresponding terminals n2i and n3i.

The application condition of the rule 3 is that, in a path from "WLr" that is the main node n1i to "D" (D(−1)←(1)fn, . . . , f1(−1)←(1)WL), a path exists in which, where the attribute of "WLr" is r and "BN" and "BX" on the outermost sides among pairs from among f1, . . . , fn are represented by f_{kN} and f_{kX}, if ∃kt:fkT=BN is satisfied, ∀i=kT, . . . , kN, kX, . . . , n:fi is not "RLr," and if ∃kt:fkT=BN is not satisfied, ∀i=1, . . . , kN, kX, . . . , n:fi is neither "RLr" nor "D."

At this time, the reduction section 15 connects the terminal n2h of "BX" that is the main node n1h with the terminal n3k of "C transmit" that is the main node n1k to each other. Consequently, the reduction section 15 generates a reduction graph 150d to which the rule 3 is applied.

The reduction section 15 applies the rule 4 to the reduction graph 150d to remove "DLr" that is the main node n1d and corresponding terminals n2d and n3d.

The application condition of the rule 4 is that, in a path from "DLr" that is the main node n1d to "D" (D(−1)←(1)fn, . . . , f1(−1)←(1)DL), a path exists in which, where the attribute of "DLr" is r and "BN" and "BX" on the outermost sides among pairs from among f1, . . . , fn are represented by f_{kN} and f_{kX}, if ∃kt:fkT=BN is satisfied, ∀i=kT, . . . , kN, kX, . . . , n:fi is not "WLr," and if ∃kt:fkT=BN is not satisfied, ∀i=1, . . . , kN, kX, . . . , n:fi is neither "WLr" nor "D."

At this time, the reduction section 15 connects a terminal n2c of "IV1" that is the main node n1c with the terminal n3e of "BN" that is the main node n1e. The reduction section 15 thereby generates a reduction graph 150e to which the rule 4 is applied.

The reduction section 15 applies the rule 5 to the reduction graph 150e to remove "BN" that is the main node n1e and corresponding terminals n2e and n3e and "BX" that is the main node n1h and corresponding terminals n2h and n3h.

The application condition of the rule 5 is that, in a path from "BN" that is the main node n1e to "BX" (BX(−1)←(1)fn, . . . , f1(−1)←(1)BN), a path exists in which, where "BN" and "BX" among pairs from among f1, . . . , fn are represented by f_{kN} and f_{kX}, ∀i=1, . . . , kN, kX, . . . , n:fi is none of "D," "RL," "WL," "DL," "BN" and "BX."

At this time, the reduction section 15 connects a terminal n2c of "IV1" that is the main node n1c with a terminal n3g of "C process" that is the main node n1g to each other and connects a terminal n2g of "C process" that is the main node n1g with a terminal n3k of "C transmit" that is the main node n1k to each other. The reduction section 15 thereby generates a reduction graph 150f to which the rule 5 is applied.

The reduction section 15 applies the rule 5 to the reduction graph 150f to remove "BN" that is the main node n1b and corresponding terminals n2b and n3b and "BX" that is the main node n1l and corresponding terminals n2l and n3l.

At this time, the reduction section 15 connects the terminal n2a of "D request" that is the main node n1a with the terminal n3c of "IV1" that is the main node n1c to each other, and connects the terminal n2k of "C transmit" that is the main node n1k with the terminal n3a of "D request" that is the main node n1a to each other. The reduction section 15 thereby generates a reduction graph 150g to which the rule 5 is applied.

The calculation section 16 illustrated in FIG. 1 calculates a hash value based on each graph (reduction graph 150g) reduced by the reduction section 15.

Figure 11:
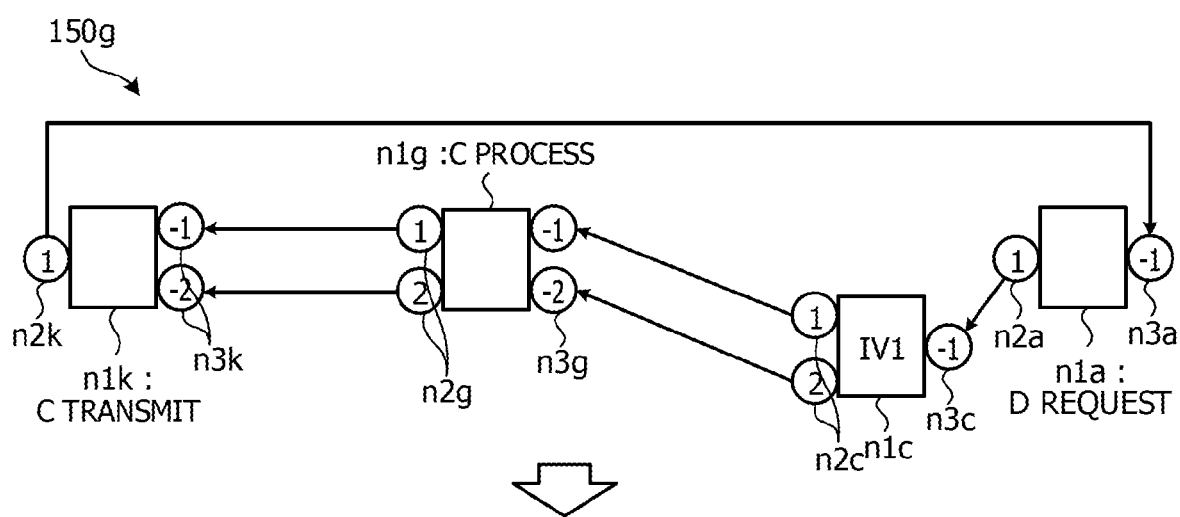
FIG. 11 illustrates an example of a calculation process.

FIG. 11 illustrates an example of a calculation process. The calculation section 16 illustrated in FIG. 1 executes the calculation process illustrated in FIG. 11. FIG. 11 illustrates the reduction graph 150g reduced by the reduction section 15. As illustrated in FIG. 11, the calculation section 16 calculates a hash value of a given length based on the reduction graph 150g. In FIG. 11, a hash value configured from a byte string of a length of 16 bytes is calculated.

For example, the calculation section 16 follows each graph in the opposite direction to the direction of a flow of processing and a flow of data to calculate a hash value. For example, in the example illustrated in FIG. 11, the calculation section 16 follows the terminal n3a←terminal n2k←terminal n3k (terminal of "−1")←terminal n2g (terminal of "1")←terminal n3g (terminal of "−1")←terminal n2c (terminal of "1")←terminal n3c←terminal n2a←terminal n3k (terminal of "−2")←terminal n2g (terminal of "2")←terminal n3g (terminal of "−2")←terminal n2c (terminal of "2") in this order to calculate a hash value.

Although the calculation section 16 follows each graph in the opposite direction to the direction of a flow of processing and the direction of a flow of data to calculate a hash value, it may otherwise follow each group in the same direction as the direction of a flow of processing and the direction of a flow of data to calculate a hash value.

In this manner, when the two source codes SCa and SCb are compared with each other, an accurate comparison process may be performed by using a hash value, and therefore, erroneous detection may be suppressed by refactoring.

By calculating a hash value following each graph in the opposite direction to the flow of processing and data, the influence of the flow of processing and data may be removed, and therefore, the comparison process may be performed with a higher degree of accuracy.

The comparison section 17 illustrated in FIG. 1 compares each of the reduced graphs (reduction graphs 150f) and outputs a difference between the two source codes SCa and SCb.

For example, the comparison section 17 compares the hash values calculated by the calculation section 16 with each other and outputs, when the hash values of the two source codes SCa and SCb coincide with each other, information indicating that the two source codes SCa and SCb are not different from each other as a comparison result. For example, in the case where the hash values coincide with each other, the comparison section 17 outputs a comparison result representing that the behaviors of the two source codes SCa and SCb are substantially the same. Consequently, it may be detected accurately whether or not there is a difference in behavior of the two source codes SCa and SCb.

In the case where the hash values do not coincide with each other, the comparison section 17 outputs a comparison result indicating that there is a difference between the two source codes SCa and SCb. For example, in the case where the hash values are different from each other, the comparison section 17 outputs a comparison result indicating that the behaviors of the two source codes SCa and SCb are different from each other.

Although the comparison section 17 decides whether or not there is a difference between the two source codes SCa and SCb by comparing the hash values, the decision is not limited to this, and for example, presence or absence of a difference may be decided by comparison of the reduction graphs 150g in regard to the shape or the like.

Figure 12:
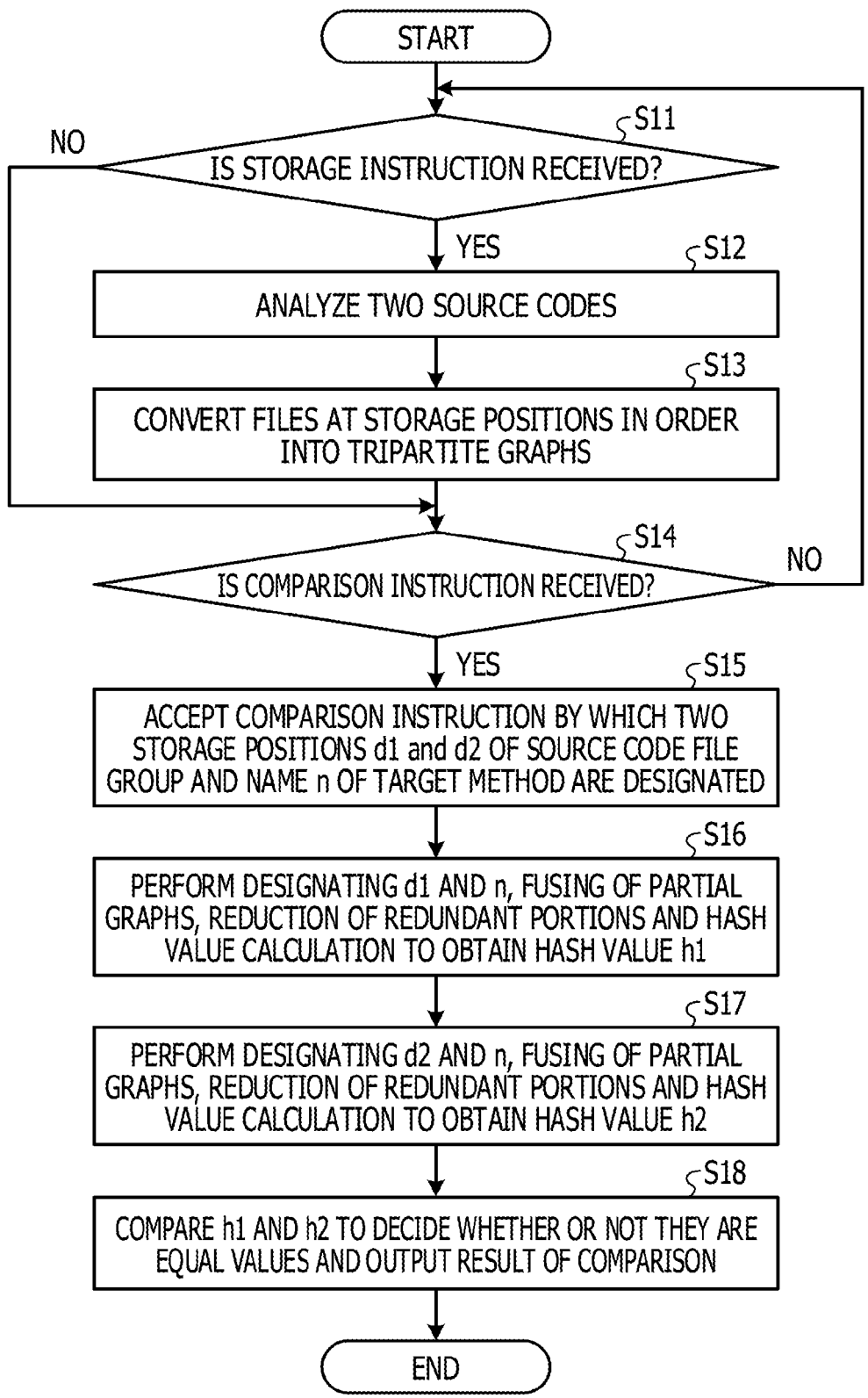
FIG. 12 illustrates an example of a process executed by an analysis apparatus.

FIG. 12 illustrates an example of processing of an analysis apparatus.

As illustrated in FIG. 12, the acceptance section 11 decides whether or not a storage instruction in which storage positions of two source codes SCa and SCb of a comparison target are designated is received (step S11). Then, in the case where the acceptance section 11 accepts the storage instruction (step S11: Yes), the analysis section 12 analyzes each of the two source codes SCa and SCb to generate an abstract syntax tree (step S12).

The conversion section 13 converts all of files at the storage positions in order into tripartite graphs 130 (step S13). For example, the conversion section 13 graphs a flow of processes and a flow of data in methods and between methods in each of the two source codes SCa and SCb based on the generated abstract syntax trees.

The acceptance section 11 decides whether or not a comparison instruction is received (step S14). In the case where a comparison instruction is received (step S14: Yes), the acceptance section 11 accepts the comparison instruction by which the two storage positions d1 and d2 of the source code file group and a name n of a target method are designated (step S15).

The fusion section 14, reduction section 15 and calculation section 16 perform fusion of the partial graphs 130a and 130b, reduction of redundant portions and hash value calculation designating the storage position d1 and the name n to obtain a hash value h1 (step S16).

The fusion section 14, reduction section 15 and calculation section 16 perform fusion of the partial graphs 130a and 130b, reduction of redundant portions and hash value calculation designating the storage position d2 and the name n to obtain a hash value h2 (step S17).

The comparison section 17 compares the hash value h1 and the hash value h2 with each other to decide whether or not they have an equal value and outputs a result of the comparison (step S18), and then ends the processing.

Figure 13:
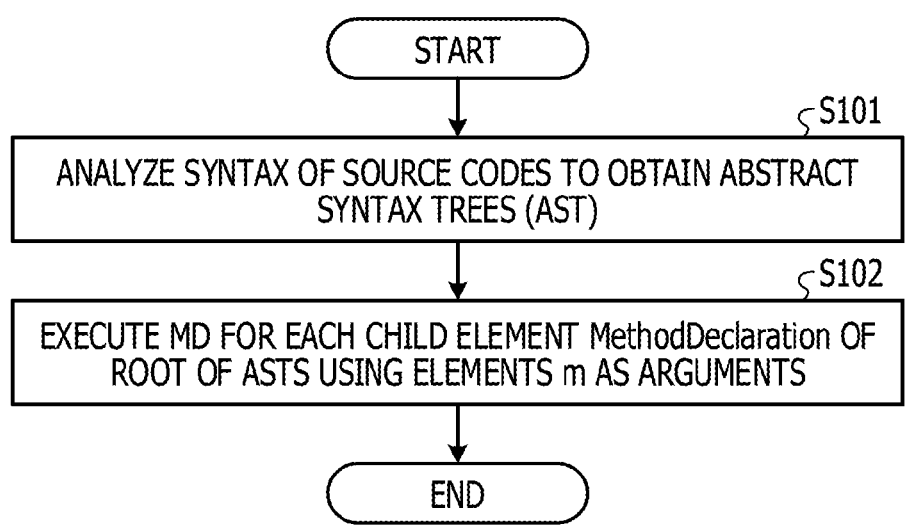
FIG. 13 illustrates an example of a conversion process.

FIG. 13 illustrates an example of a conversion process. As illustrated in FIG. 13, the analysis section 12 analyzes the syntax of each of the two source codes SCa and SCb to obtain abstract syntax trees (each hereinafter referred to as AST) (step S101).

The conversion section 13 executes a first process (MD) for each child element (MethodDeclaration) of the root of AST using the element m as an argument (step S102) and then ends the conversion process.

Figure 14:
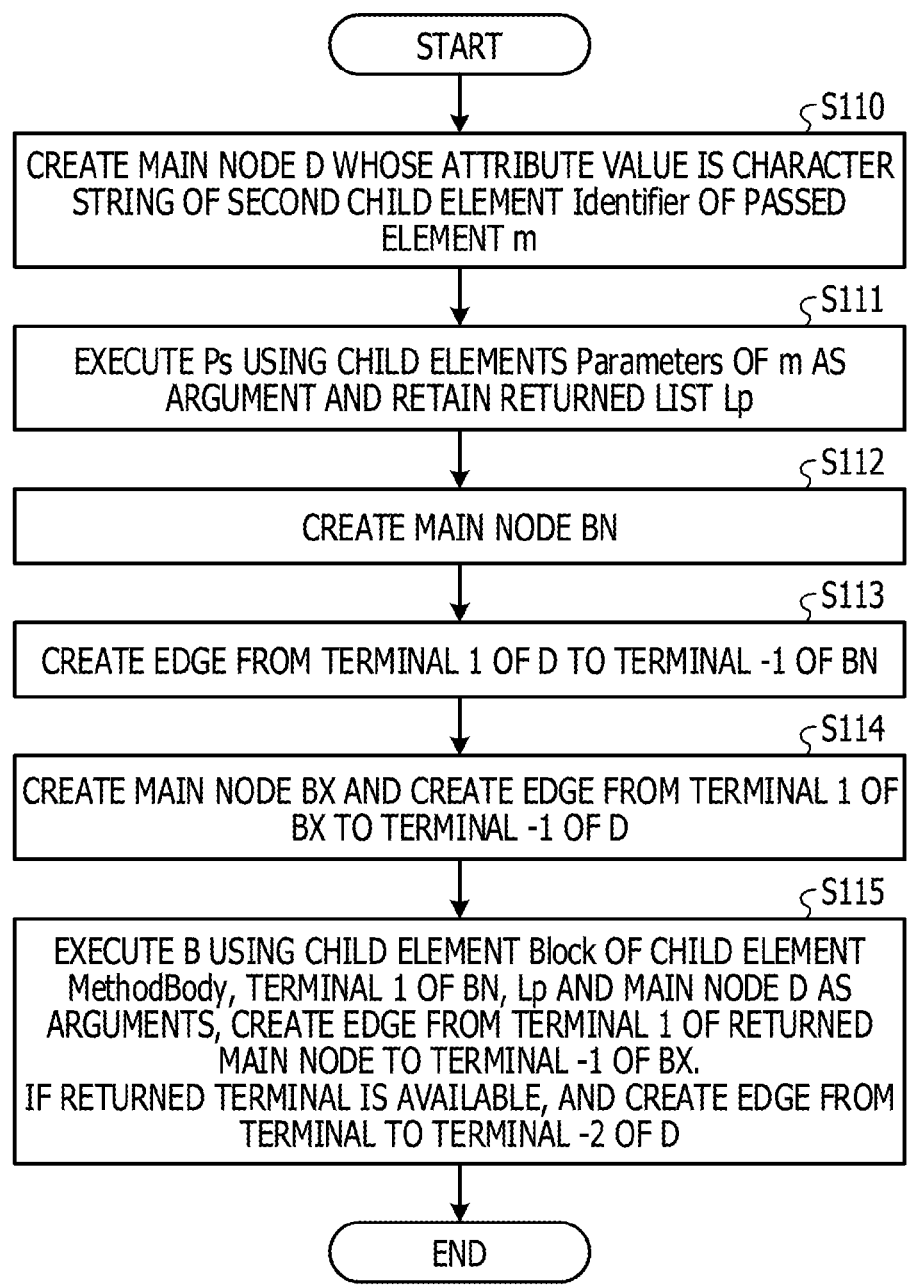
FIG. 14 illustrates an example of a first process (MD)

FIG. 14 illustrates an example of a first process (MD). As illustrated in FIG. 14, the conversion section 13 creates a main node "D" (for example, the main node n1a of FIG. 8) whose attribute value is a character string of the second child element (Identifier) of the element m passed thereto (step S110).

The conversion section 13 executes a second process (Ps) using child elements (Parameters) of the element m as arguments and retains a returned list Lp (step S111). Then, the conversion section 13 creates a main node "BN" (for example, the main node n1b of FIG. 8) (step S112).

The conversion section 13 creates an edge from the terminal "1" (for example, the terminal n2a of FIG. 8) of the main node "D" to the terminal "−1" (for example, the terminal n3b of FIG. 8) of the main node "BN" (step S113). Then, the conversion section 13 creates a main node "BX" (for example, the main node n11 of FIG. 8) and creates an edge e from the terminal "1" (for example, the terminal n21 of FIG. 8) of the main node "BX" to the terminal "−1" of the main node "D" (step S114).

The conversion section 13 executes a third process (B) using a child element (Block) of the child element (Method-Body), the terminal "1" of the main node "BN," the list Lp and the main node "D" as arguments and creates an edge from the terminal "1" of the main node returned thereto to the terminal "−1" of the main node "BX" (step S115). At this time, if some terminal is returned, the conversion section 13 creates an edge e from the returned terminal to the terminal "−2" of the main node "D," and then ends the first process.

Figure 15:
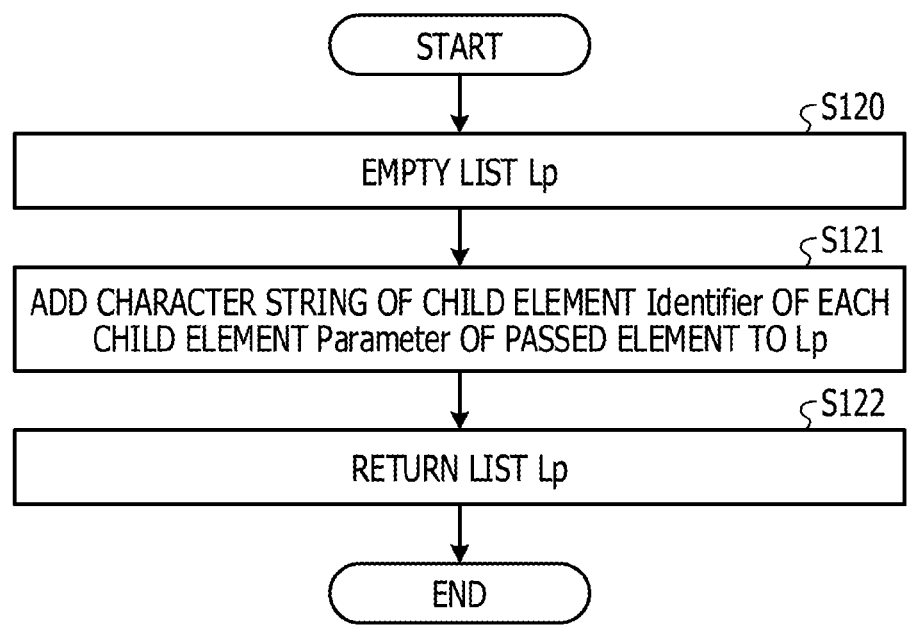
FIG. 15 illustrates an example of a second process (PS)

FIG. 15 illustrates an example of a second process (PS). As illustrated in FIG. 15, the conversion section 13 first empties the list Lp (step S120).

The conversion section 13 adds a character string of the child element (Identifier) of each child element (Parameter) of the element passed thereto to the list Lp (step S121). The conversion section 13 returns the list Lp to the first process (step S122) and ends the processing.

Figure 16:
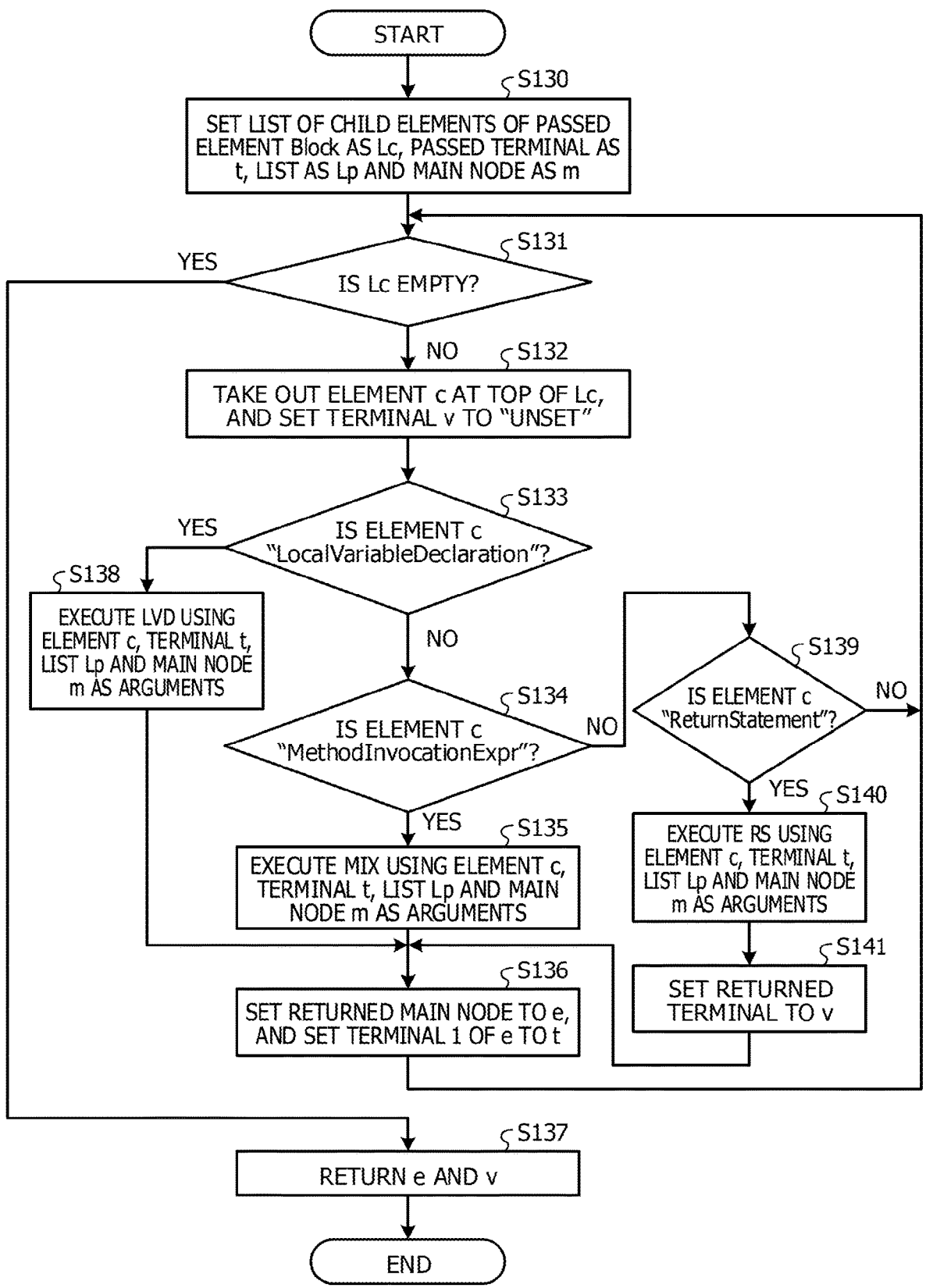
FIG. 16 illustrates an example of a third process (B)

FIG. 16 illustrates an example of a third process (B). As illustrated in FIG. 16, the conversion section 13 sets the list of child elements of the element (Block) passed thereto as Lc, the terminal passed thereto as t, the list as Lp and main node as m (step S130).

The conversion section 13 decides whether or not Lc is empty (step S131). In the case where Lc is not empty (step S131: No), the conversion section 13 takes out the top element c of Lc (step S132). At this time, the terminal v is set to "unset."

The conversion section 13 decides whether or not the element c is a child element (LocalVariableDeclaration) (step S133). In the case where the element c is not a child element (LocalVariableDeclaration) (step S133: No), the conversion section 13 decides whether or not the element c is another child element (MethodInvocationExpr) (step S134).

In the case where the element c is a child element (MethodInvocationExpr) (step S134: Yes), the conversion section 13 executes a sixth process (MIX) using the element c, terminal t, list Lp and main node m as arguments (step S135).

The conversion section 13 sets a main node returned thereto to e and sets the terminal "1" of e to t (step S136). Thereafter, the processing advances to step S131.

In the case where Lc is empty at step S131 (step S131: Yes), the conversion section 13 returns e and v to the first process (step S137), and then ends the processing.

In the case where the element c is a child element (LocalVariableDeclaration) at step S133 (step S133: Yes), the conversion section 13 executes a fourth process (LVD) using the element c, terminal t, list Lp and main node m as arguments (step S138), and the processing advances to step S136.

In the case where the element c is not a child element (MethodInvocationExpr) at step S134 (step S134: No), the conversion section 13 decides whether or not the element c is another child element (ReturnStatement) (step S139).

In the case where the element c is the child element (ReturnStatement) (step S139: Yes), the conversion section 13 executes a fifth process (RS) using the element c, terminal t, list Lp and main node m as arguments (step S140). Then, the conversion section 13 sets the terminal returned thereto to v (step S141) and then advances the processing to step S136.

In the case where the element c is not the child element (ReturnStatement) (step S139: No), the conversion section 13 advances the processing to step S131.

Figure 17:
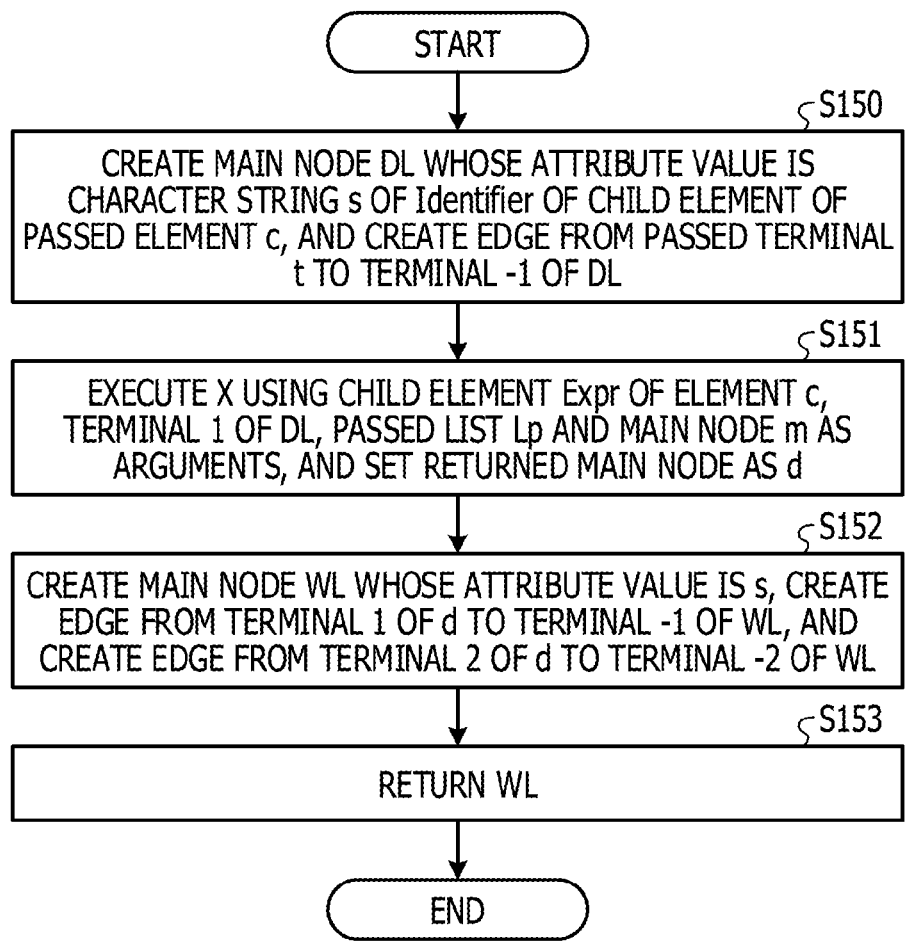
FIG. 17 illustrates an example of a fourth process (LVD)

FIG. 17 illustrates an example of a fourth process (LVD). As illustrated in FIG. 17, the conversion section 13 creates a main node "DL" (for example, the main node n1d of FIG. 8) whose attribute value is a character string s of the child element (Identifier) of the element c passed thereto and creates an edge e from the terminal t passed thereto to the terminal "−1" of "DL" (step S150).

The conversion section 13 executes a seventh process (X) using a child element (Expr) of the element c, the terminal "1" of "DL," a list Lp and a main node m passed thereto as arguments and sets a main node returned thereto as d (step S151).

The conversion section 13 creates a main node "WL" (for example, the main node n1i of FIG. 8) having an attribute value s, creates an edge e from the terminal "1" of d to the terminal "−1" of "WL," and creates an edge e from the terminal "2" of d to the terminal "−2" of "WL" (step S152). The conversion section 13 returns "WL" to the third process (step S153) and ends the processing.

Figure 18:
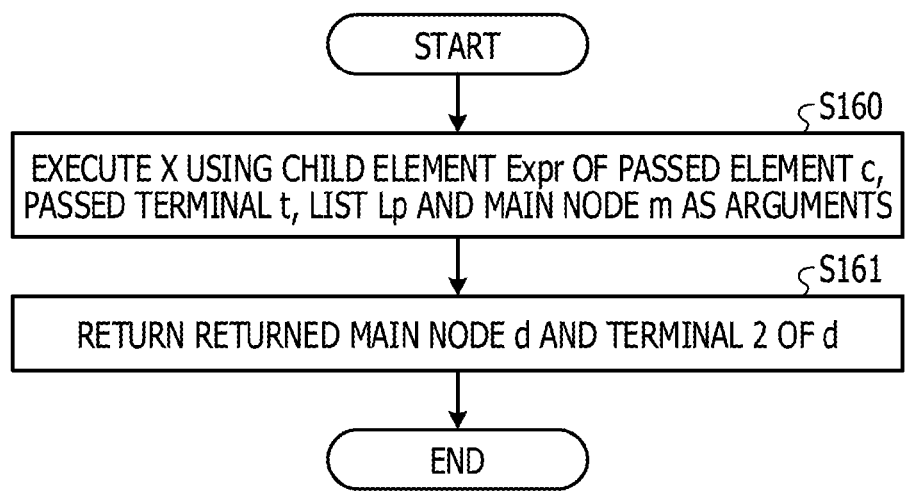
FIG. 18 illustrates an example of a fifth process (RS)

FIG. 18 illustrates an example of a fifth process (RS). As illustrated in FIG. 18, the conversion section 13 executes a seventh process (X) using the child element (Expr) of the element c passed thereto and the terminal t, list Lp and main node m passed thereto as arguments (step S160). Then, the conversion section 13 returns the main node d returned thereto and the terminal "2" of d to the third process (step S161) and then ends the processing.

Figure 19:
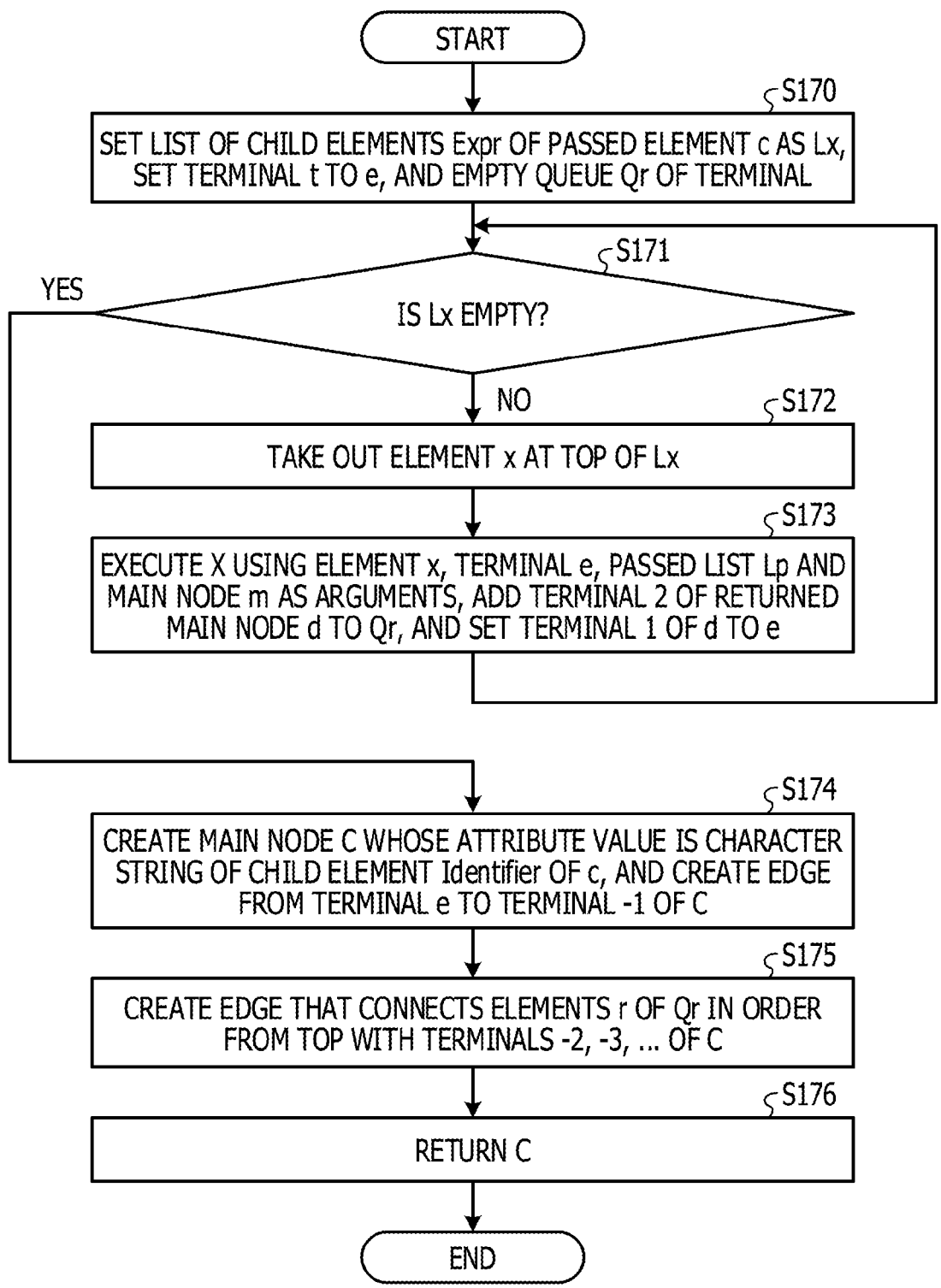
FIG. 19 illustrates an example of a sixth process (MIX)

FIG. 19 illustrates an example of a sixth process (MIX). As illustrated in FIG. 19, the conversion section 13 determines a list of child elements (Expr) of the element c passed thereto as Lx and sets the terminal t to e, and then empties a queue Qr of the terminal (step S170).

The conversion section 13 decides whether or not Lx is empty (step S171). In the case where Lx is not empty (step S171: No), the conversion section 13 takes out an element x at the top of Lx (step S172).

The conversion section 13 executes a seventh process (X) using the element x, terminal e and list Lp and main node m passed thereto as arguments, adds the terminal "2" of the main node d returned thereto to Qr and sets the terminal "1" of d toe (step S173). Then, the processing advances to step S171.

On the other hand, in the case where Lx is empty (step S171: Yes), the conversion section 13 creates a main node "C" (for example, the main node n1g of FIG. 8) whose attribute value is a character string of a child element (Identifier) of the element c and creates an edge e from the terminal e to the terminal "−1" of "C" (step S174).

The conversion section 13 creates an edge e that connects the elements r of Qr in order from the top with the terminals "−2," "−3," . . . of "C" (step S175). The conversion section 13 returns "C" to the third process (step S176) and ends the processing.

Figure 20:
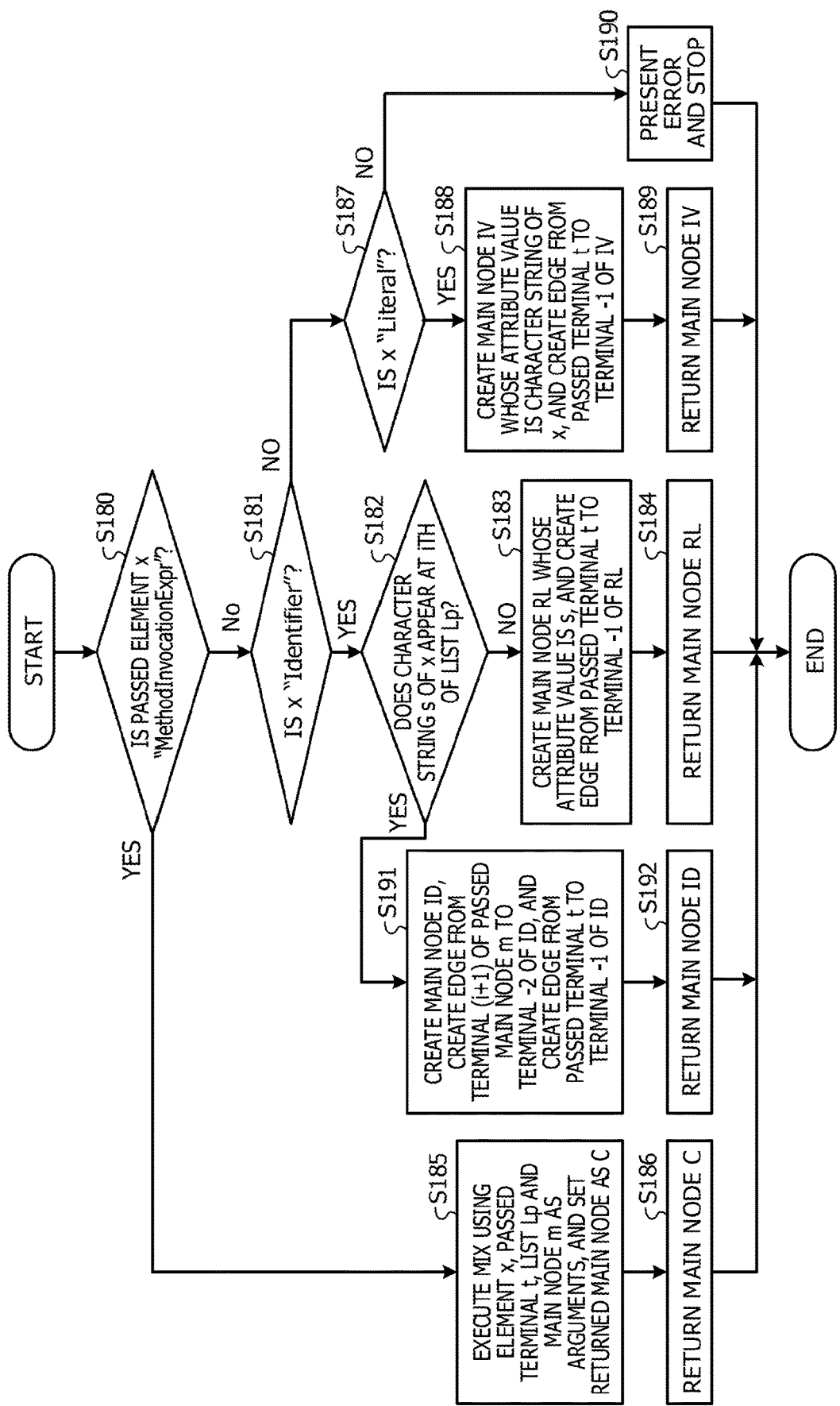
FIG. 20 illustrates an example of a seventh process (X)

FIG. 20 illustrates an example of a seventh process (X). As illustrated in FIG. 20, the conversion section 13 decides whether or not the element x passed thereto is a child element (MethodInvocationExpr) (step S180).

In the case where the element x is not the child element (MethodInvocationExpr) (step S180: No), the conversion section 13 decides whether or not the element x is another child element (Identifier) (step S181).

In the case where the element x is the child element (Identifier) (step S181: Yes), the conversion section 13 decides whether or not a character string s of x appears at the ith in the list Lp (step S182).

In the case where the character string s of x does not appear at the ith of the list Lp (step S182: No), the conversion section 13 creates a main node "RL" (for example, the main node n1j) whose attribute value is s and creates an edge from the terminal t passed thereto to the terminal "−1" of "RL" (step S183). Then, the conversion section 13 returns the main node "RL" to the fifth process (step S184) and then ends the processing.

In the case where the element x passed to the conversion section 13 is the child element (MethodInvocationExpr) at step S180 (step S180: Yes), the conversion section 13 executes a sixth process using the element x and the terminal t, list Lp and main node m passed thereto as arguments, and sets a main node returned thereto as "C" (step S185). Then, the conversion section 13 returns the main node "C" to the fifth process (step S186), and ends the processing.

In the case where the element x is not the child element (Identifier) at step S181 (step S181: No), the conversion section 13 decides whether or not the element x is another child element (Literal) (step S187).

In the case where the element x is the child element (Literal) (step S187: Yes), the conversion section 13 creates a main node "IV" (for example, the node n1c of FIG. 8) whose attribute value is a character string of the element x and creates an edge from the terminal t passed thereto to the terminal "−1" of "IV" (step S188). The conversion section 13 returns the main node "IV" to the fifth process (step S189) and ends the processing.

In the case where the element x is not the child element (Literal) at step S187 (step S187: No), the conversion section 13 presents an error and stops (step S190) and then ends the processing.

In the case where the character string s of x appears at the ith of the list Lp at step S182 (step S182: Yes), the conversion section 13 creates a main node "ID" (for example, the main node n1f of FIG. 8), creates an edge from the terminal "i+1" of the main node m passed thereto to the terminal "−2" of "ID," and creates an edge from the terminal t passed thereto to the terminal "−1" of "ID" (step S191). The conversion section 13 returns the main node "ID" to the fifth process (step S192) and ends the processing.

Figure 21A:
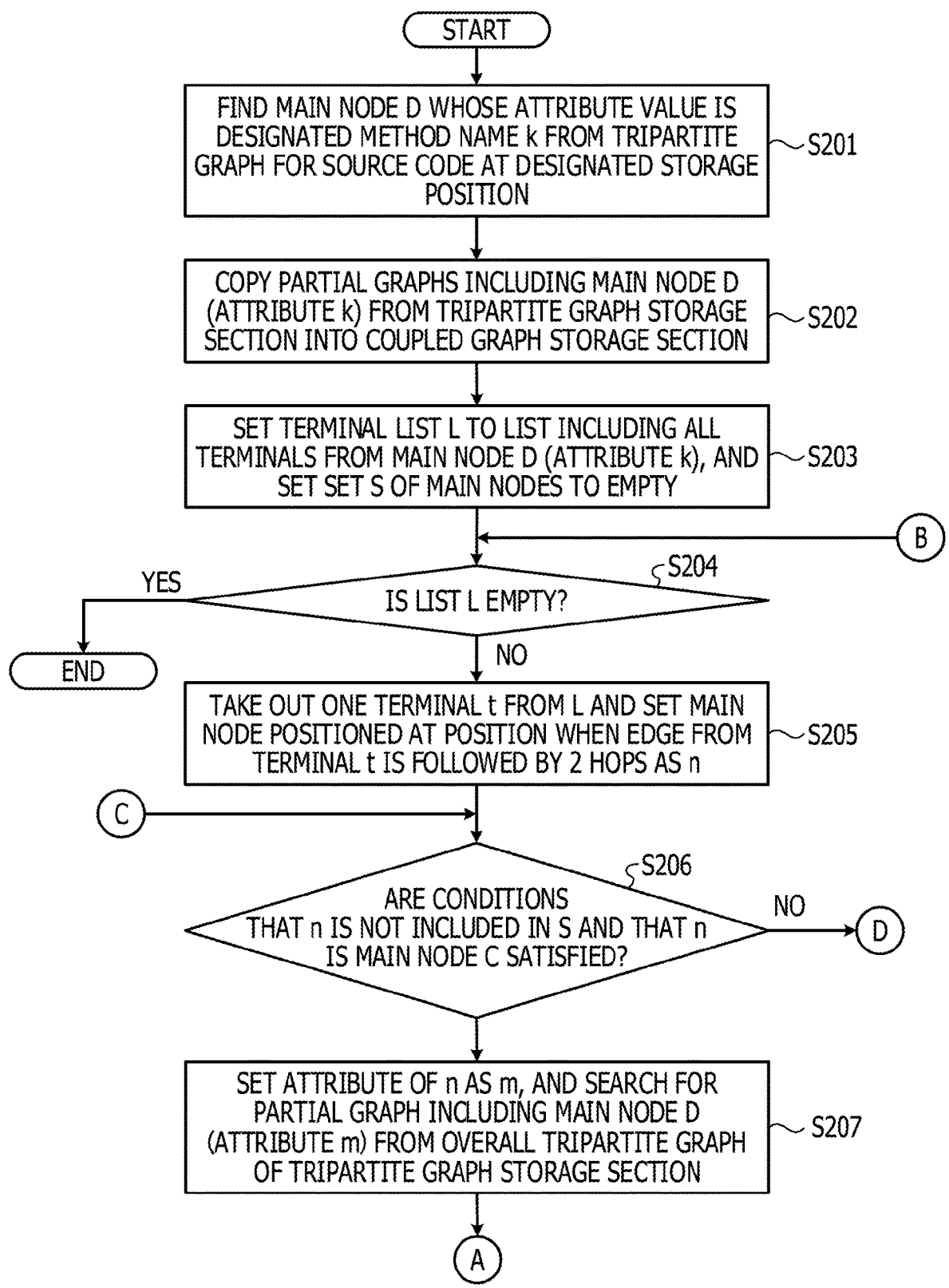
FIGS. 21A and 21B illustrate an example of a fusion process.
Figure 21B:
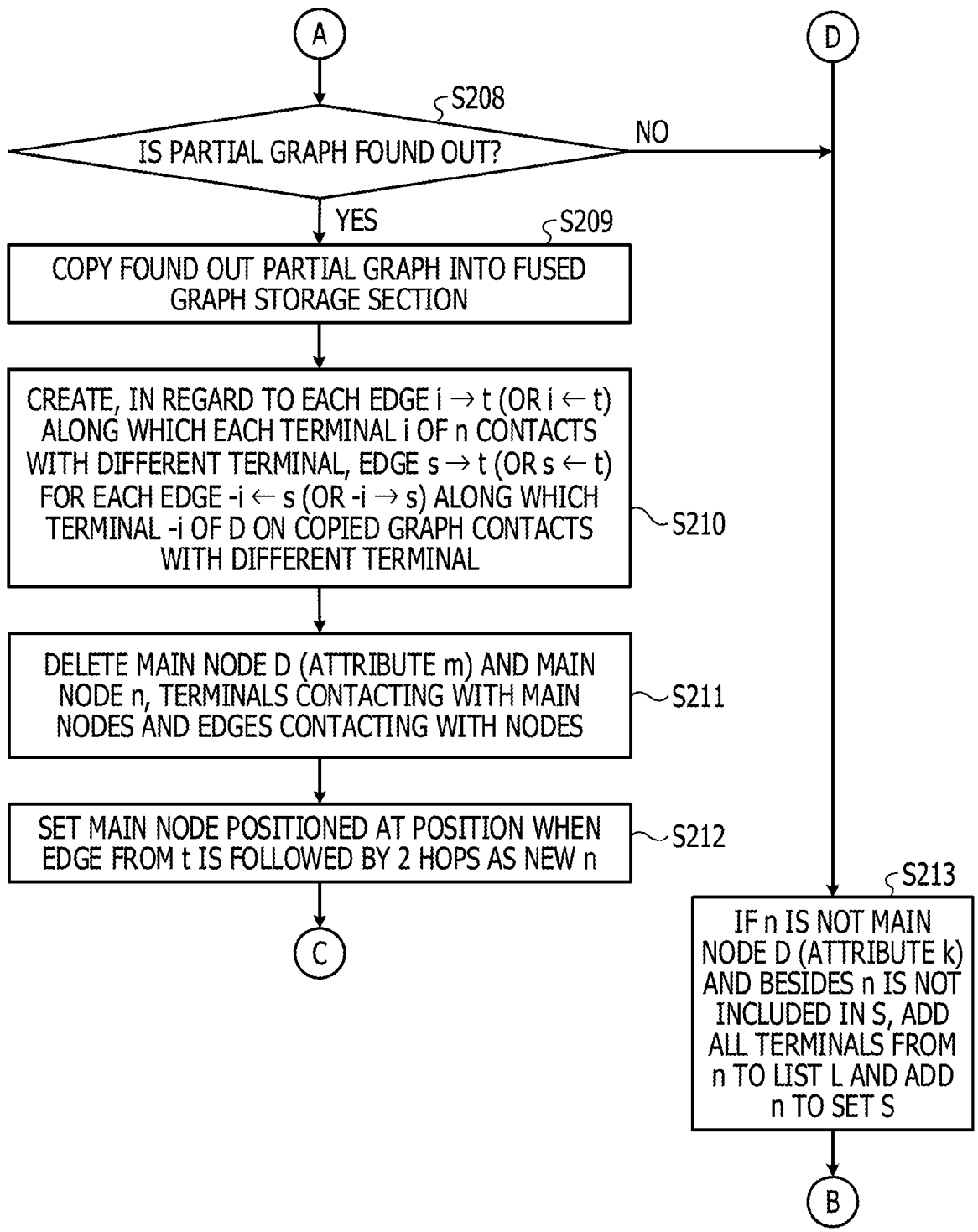

FIGS. 21A and 21B illustrate an example of a fusion process. As illustrated in FIGS. 21A and 21B, the fusion section 14 finds a main node "D" whose attribute value is a designated method name k from within the tripartite graph 130 for a source code SC at the designated storage position (step S201).

The fusion section 14 copies the partial graphs 130a and 130b including the main node "D" (attribute k) from the tripartite graph storage section 113 into the fused graph storage section 114 (step S202).

The fusion section 14 sets a terminal list L to a list that includes all terminals output from the main node "D" (attribute k) and sets a set S of main nodes to empty (step S203). Then, the fusion section 14 decides whether or not the list L is empty (step S204).

In the case where the list L is not empty (step S204: No), the fusion section 14 takes out one terminal t from the list L and sets a main node positioned at a position when an edge output from the terminal t is followed by two hops as n (step S205).

The fusion section 14 decides whether or not conditions that n is not included in the set S and that n is the main node "C" are satisfied (step S206). In the case where the conditions are satisfied (step S206: Yes), the fusion section 14 sets an attribute of n as m and searches for partial graphs 130a and 130b that include the main node "D" (attribute m) from within the overall tripartite graph 130 of the tripartite graph storage section 113 (step S207).

The fusion section 14 decides whether or not the partial graphs 130a and 130b including the main node "D" (attribute m) are found out (step S208). In the case where the partial graphs 130a and 130b that include the main node "D" (attribute m) are found (step S208: Yes), the fusion section 14 copies the found out partial graphs 130a and 130b into the fused graph storage section 114 (step S209).

The fusion section 14 creates, in regard to each edge i→t (or i←t) along which each terminal i of n contacts a different terminal, an edge s→t (or s←t) for each edge −i←s (or −i→s) along which a terminal −i of "D" on the copied graph contacts a different terminal (step S210).

The fusion section 14 deletes the main node "D" (attribute m) and the main node n, terminals that contact the main nodes and edges that contact the nodes (step S211). The fusion section 14 sets a main node positioned at a position when an edge output from t is followed by two hops as new n (step S212) and advances the processing to step S206.

In the case where the list L is empty at step S204 (step S204: Yes), the fusion section 14 ends the processing.

In the case where at least one of the condition that n is not included in S and the condition that n is the main node "C" is not satisfied at step S206 (step S206: No), if n is not the main node "D" (attribute k) and besides n is not included in S, the fusion section 14 adds all terminals output from n to the list L and adds n to the set S (step S213). Then, the processing advances to step S204.

In the case where the partial graphs 130a and 130b that include the main node "D" (attribute m) are not found out at step S208 (step S208: No), the fusion section 14 advances the processing to step S213.

Figure 22:
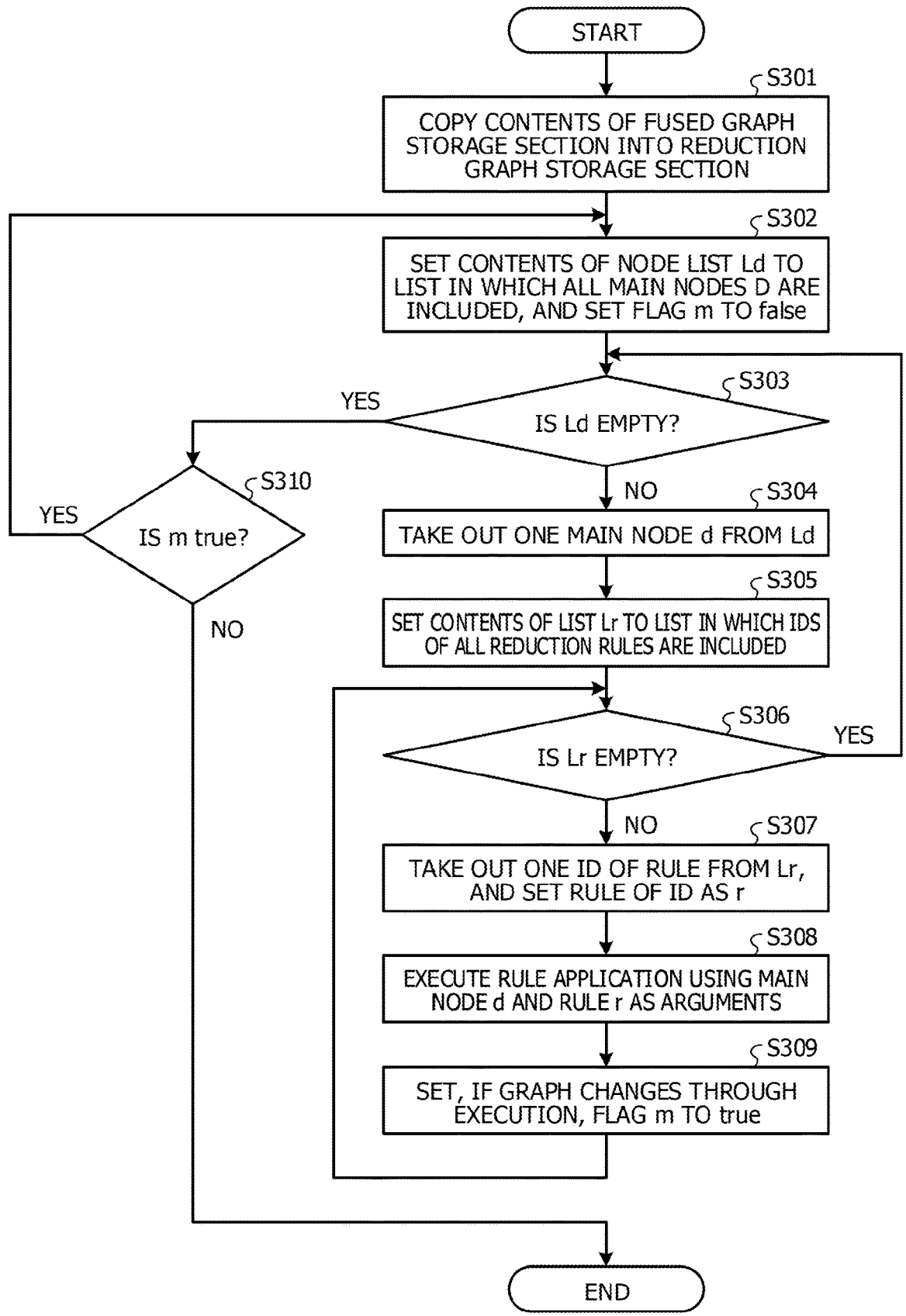
FIG. 22 illustrates an example of a reduction process.

FIG. 22 illustrates an example of a reduction process. As illustrated in FIG. 22, the reduction section 15 copies contents of the fused graph storage section 114 into the reduction graph storage section 115 (step S301).

The reduction section 15 sets the contents of the node list Ld as a list in which all of the main nodes "D" are included and sets a flag m to "false" (step S302). The reduction section 15 decides whether or not Ld is empty (step S303).

In the case where Ld is not empty (step S303: No), the reduction section 15 takes out one main node d from Ld (step S304). Then, the reduction section 15 sets contents of a list Lr to a list in which the IDs of all reduction rules are included (step S305).

The reduction section 15 decides whether or not Lr is empty (step S306). In the case where Lr is not empty (step S306: No), the reduction section 15 takes out one ID of a rule from Lr and sets the rule of the ID as r (step S307).

The reduction section 15 executes a first process (rule application) using the main node d and the rule r as arguments (step S308). If a graph (any of the reduction graphs 150a to 150g) changes as a result of execution of the rule r, the reduction section 15 sets the flag m to "true" (step S309) and advances the processing to step S306.

In the case where Ld is empty at step S303 (step S303: Yes), the reduction section 15 decides whether or not m is "true" (step S310). In the case where m is not "true" (step S310: No), the reduction section 15 ends the processing.

In the case where m is "true" (step S310: Yes), the reduction section 15 advances the processing to step S302. In the case where Lr is empty at step S306 (step S306: Yes), the reduction section 15 advances the processing to step S303.

Figure 23:
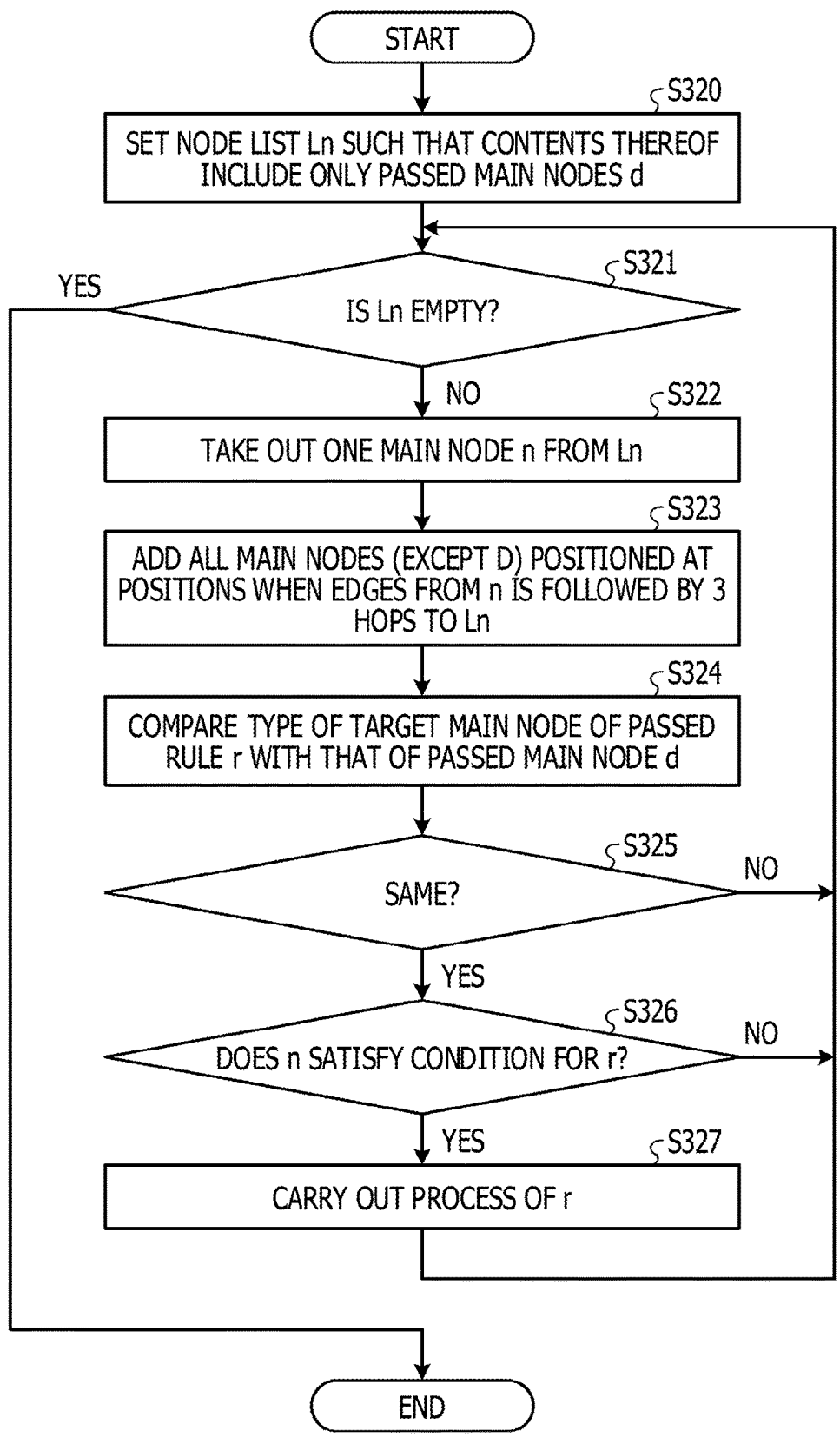
FIG. 23 illustrates an example of a first process (rule application)

FIG. 23 illustrates an example of a first process (rule application). As illustrated in FIG. 23, the reduction section 15 forms contents of a node list Ln such that the contents thereof include only the main nodes d passed thereto (step S320).

The reduction section 15 decides whether or not Ln is empty (step S321). In the case where Ln is not empty (step S321: No), the reduction section 15 takes out one main node n from Ln (step S322).

The reduction section 15 adds all main nodes (except "D") positioned at positions when edges output from n are followed by 3 hops to Ln (step S323). The reduction section 15 compares the type of the target main node of the rule r passed thereto with the main node d passed thereto (step S324).

The reduction section 15 decides whether or not a result of the comparison indicates coincidence (step S325). In the case where the result of the comparison indicates coincidence (step S325: Yes), the reduction section 15 decides whether or not n satisfies the condition for r (step S326).

In the case where n satisfies the condition for r (step S326: Yes), the reduction section 15 carries out the process of r (step S327) and advances the processing to step S321.

In the case where Ln is empty at step S321 (step S321: Yes), the reduction section 15 ends the processing. Further, in the case where the comparison result does not indicate coincidence at step 325 (step S325: No), the reduction section 15 advances the processing to step S321. In the case where n does not satisfy the condition for r at step S326 (step S326: No), the reduction section 15 advances the processing to step S321.

Figure 24:
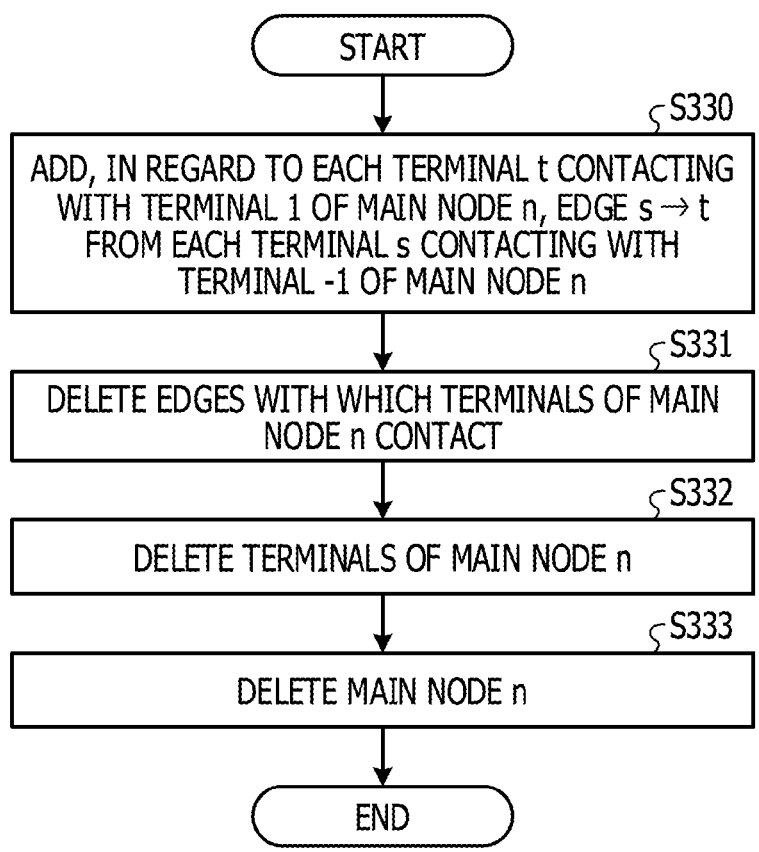
FIG. 24 illustrates an example of a node skip process.

FIG. 24 illustrates an example of a node skip process. In the reduction process, the node skip process illustrated in FIG. 24 is executed. For example, in FIG. 24, the target of the node skip process is the main node n.

As illustrated in FIG. 24, the reduction section 15 adds, in regard to each of the terminals t that contact the terminal "1" of the main node n, an edge s→t from each terminal s that contacts the terminal "−1" of the main node n (step S330).

The reduction section 15 deletes the edges that each of the terminals of the main node n contact (step S331). The reduction section 15 deletes each of the terminals of the main node n (step S332). Then, the reduction section 15 deletes the main node n (step S333) and ends the processing.

Figure 25:
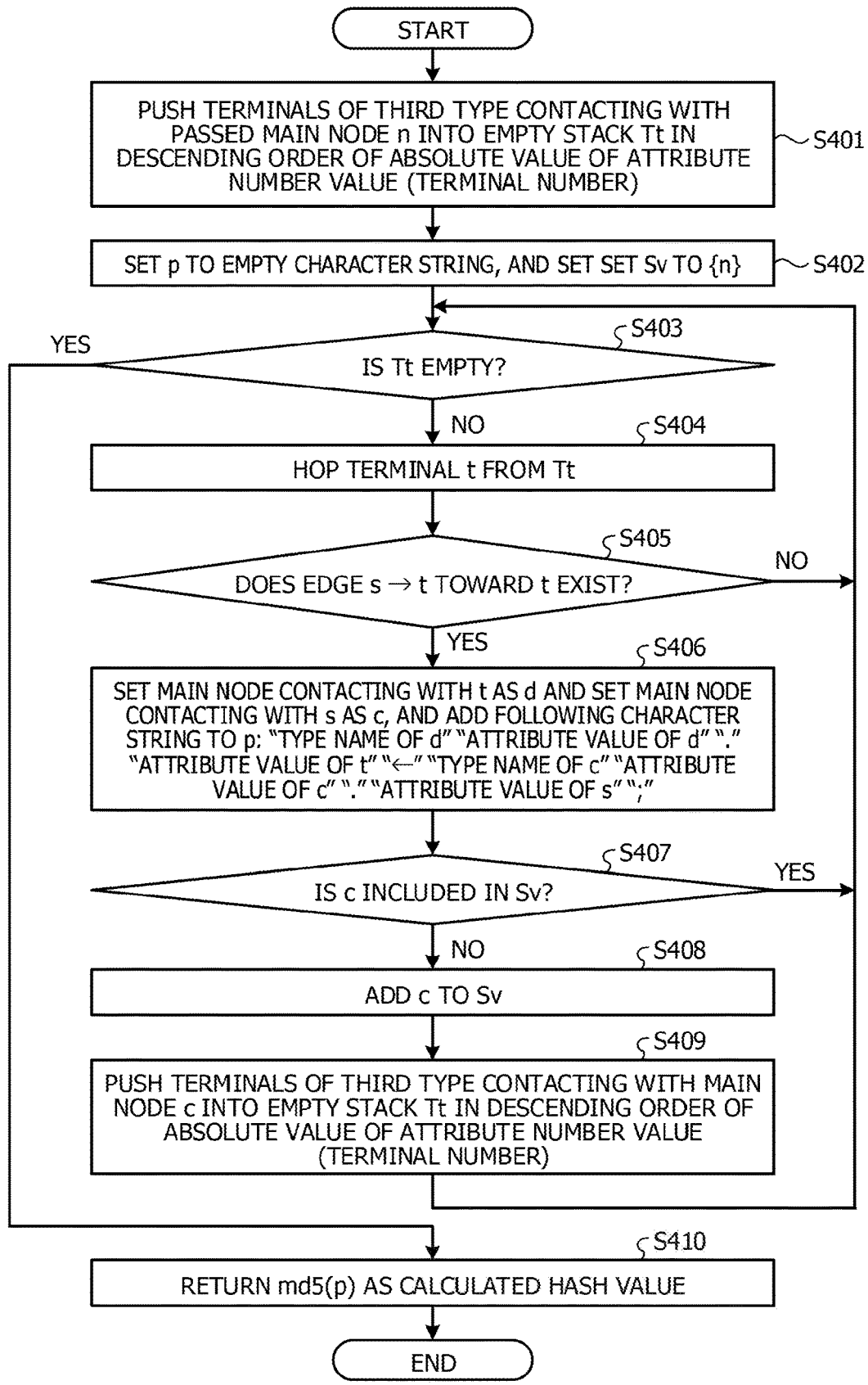
FIG. 25 illustrates an example of a calculation process.

FIG. 25 illustrates an example of a calculation process. In FIG. 25, a calculation process of a hash value is illustrated. As illustrated in FIG. 25, the calculation section 16 pushes third nodes (terminals) that contact the main node n passed thereto into an empty stack Tt in the descending order of the absolute value of an attribute number value (terminal number) (step S401).

The calculation section 16 sets p to an empty character string and sets a set Sv to {n} (step S402). The reduction section 15 decides whether or not Tt is empty (step S403).

In the case where Tt is not empty (step S403: No), the calculation section 16 hops the terminal t from Tt (step S404). The calculation section 16 decides whether or not there exists an edge s→t toward t (step S405).

In the case where there exists an edge s→t toward t (step S405: Yes), the calculation section 16 sets the main node contacting with t as d and sets the main node that contacts s as c, and adds the following character string "'type name of d" "attribute value of d" "." "attribute value of t" "←," "type name of c" "attribute value of c" "attribute value of s" ";'" to p (step S406).

The calculation section 16 decides whether or not c is included in Sv (step S407). In the case where c is not included in Sv (step S407: No), the calculation section 16 adds c to Sv (step S408). The calculation section 16 pushes the third nodes (terminals) that contact the main node c into the empty stack Tt in the descending order of the absolute value of an attribute number value (terminal number) (step S409). Then, the processing is advanced to step S403.

In the case where Tt is empty at step S403 (step S403: Yes), the calculation section 16 returns md5(p) as a calculated hash value (step S410) and ends the processing.

In the case where an edge s→t toward t does not exist at step S405 (step S405: No), the calculation section 16 advances the processing to step S403. In the case where c is included in Sv at step S407 (step S407: Yes), the calculation section 16 advances the processing to step S403.

As described above, the analysis apparatus 1 includes the analysis section 12, conversion section 13, reduction section 15 and comparison section 17. The analysis section 12 acquires two source codes SCa and SCb of a comparison target and analyzes each of the acquired source codes SC to generate abstract syntax trees of the two source codes SCa and SCb. The conversion section 13 graphs flows of processes and flows of data in methods and between methods in the two source codes SCa and SCb based on the generated abstract syntax trees. The reduction section 15 reduces redundant portions of each of graphs of the two graphed source codes SCa and SCb based on a given rule. The comparison section 17 compares each of the reduced graphs and outputs a difference between the two source codes SCa and SCb.

Consequently, since the influence of change of any of the source codes SCa and SCb caused by division of a method or composition of methods is suppressed, misdetection that the behavior of the program has been changed by refactoring is reduced.

All or part of the sections illustrated in the figures may be functionally or physically disintegrated or integrated in an arbitrary unit in response to various loads, use situations and so forth. For example, the analysis section 12 and the conversion section 13 may be integrated with each other. The processes illustrated in the figures are not limited in terms of the order described above and may be carried out simultaneously or in a changed order without making the processing contents contradictory.

All or arbitrary part of the various processing functions performed by the various apparatuses may be executed by a central processing unit (CPU) (or a microcomputer such as a microprocessor unit (MPU), a micro controller unit (MCU) or the like). All or arbitrary part of the various processing functions may be executed by a program analyzed and executed by a CPU (or a microcomputer such as an MPU, an MCU or the like) or by hardware according to wired logics.

Figure 26:
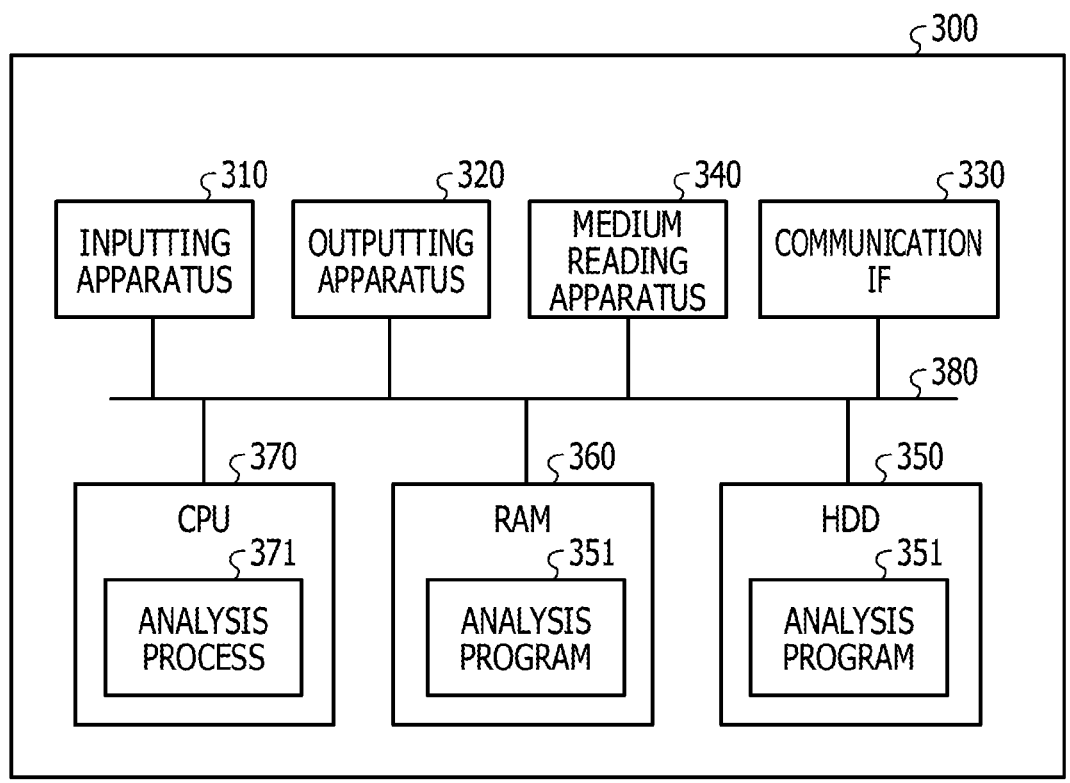
FIG. 26 illustrates an example of an analysis program.

The various functions described above are implemented by executing a program prepared in advance on a computer. FIG. 26 illustrates an example of a computer. The computer illustrated in FIG. 26 may execute an analysis program having functions similar to those of the embodiment described hereinabove.

As illustrated in FIG. 26, the computer 300 includes a CPU 370 that executes various arithmetic operations, an inputting apparatus 310 that accepts a data input and an outputting apparatus 320. The computer 300 further includes a medium reading apparatus 340 that reads a program and so forth from a storage medium, and a communication interface (IF) 330 that performs transfer of data to and from various apparatuses. The computer 300 further includes a random access memory (RAM) 360 that temporarily stores various kinds of information, and a hard disk drive (HDD) 350. Further, each of the apparatus 310 to 370 is coupled to a bus 380.

The HDD 350 has stored therein an analysis program 351 that has function similar to that of each of the processing parts including the acceptance section 11, analysis section 12, conversion section 13, fusion section 14, reduction section 15, calculation section 16 and comparison section 17 illustrated in FIG. 1. Further, the HDD 350 has stored therein various data for implementing the source code file group storage section 111, abstract syntax tree storage section 112, tripartite graph storage section 113, fused graph storage section 114, reduction graph storage section 115, hash value storage section 116 and analysis program 351. The inputting apparatus 310 accepts an input of various kinds of information, for example, from a manager of the computer 300. The outputting apparatus 320 displays various screen images, for example, to the manager of the computer 300. The communication IF 330 is coupled to a network and exchanges various kinds of information with various apparatuses.

The CPU 370 performs an analysis process 371 by reading out the programs stored in the HDD 350 and deploying and executing the programs in the RAM 360. The programs may cause the computer 300 to function as the analysis section 12, conversion section 13, fusion section 14, reduction section 15, calculation section 16 and comparison section 17 illustrated in FIG. 1.

The analysis program 351 may not necessarily be stored in the HDD 350. For example, the programs stored in a storage medium that may be read by the computer 300 may be read out and executed by the computer 300. The storage medium that may be read by the computer 300 may be a portable recording medium such as a compact disc read only memory (CD-ROM), a digital versatile disc (DVD), a universal serial bus (USB) memory or the like, a semiconductor memory such as a flash memory or the like, a hard disk drive or the like. The analysis program may be stored in an apparatus coupled to a public network, the Internet, a local area network (LAN) or the like such that the computer 300 reads out the analysis program from the apparatus and executes the analysis program.

All examples and conditional language recited herein of the RFID tag and the high frequency circuit are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An analysis apparatus, comprising:
a memory; and
a processor coupled to the memory,
wherein the processor:
acquires two source codes of a comparison target;
generates two abstract syntax trees of the two source codes by analyzing the two source codes;
graphs, based on the respective two abstract syntax trees, a flow of processing and a flow of data in methods and between methods in the respective two source codes by performing conversion into a tripartite graph that indicates a relation of connection of a first node corresponding to the processing, a second node corresponding to reference to the data and a third node corresponding to setting of the data to generate respective two tripartite graphs each including the first node, the second node and the third node, each of the second node and the third node having an attribute value indicating an attribute of the data;
reduces, based on a given rule, one or more redundant portions of the respective two tripartite graphs; and
performs comparison of the two reduced tripartite graphs and outputs a difference between the two source codes based on a result of the comparison,
wherein the processor is configured to perform a processing of:
first-pushing, into a stack, third nodes which contact the first node included in each of the two reduced tripartite graphs in the descending order of the absolute value of the third nodes;
hopping, from the stack, one of the third nodes when the stack is not empty;
deciding whether there exists an edge from another node toward the one of the third nodes;
adding, in a character string, a type name of the first node which contacts the one of the third nodes, the attribute value of the first node which contacts the one of the third nodes, the attribute value of the one of the third nodes, the type name of the first node which contacts the another node, the attribute value of the first node which contacts the another node and the attribute value of the another node, when deciding that the edge from the another node toward the one of the third nodes exists;
second-pushing, into the stack, third nodes which contact the first node which contacts the another node in the descending order of the absolute value of the third nodes;
repeating the hopping, the deciding, the adding, and the second-pushing until the stack becomes empty;
first-calculating a hash value of the character string when the stack becomes empty for each of the two reduced tripartite graphs; and
second calculating the difference using the hash values for the two reduced tripartite graphs.

2. The analysis apparatus according to claim 1, wherein the processor replaces one partial graph, which is included in one of the two tripartite graphs and includes at least one node, with another partial graph, which is included in the one of the two tripartite graphs and includes at least one node, and generates a partial graph, which includes the another partial graph and does not include the one partial graph, of a definition of a given method.

3. The analysis apparatus according to claim 1, wherein the processing further includes:
setting, in a set, the first node included in each of the two reduced tripartite graphs;
deciding whether the first node which contacts the another node is included in the set; and
performing the first-calculating when deciding the first node which contacts the another node is included in the set.

4. The analysis apparatus according to claim 1, wherein the processor calculates the hash value by following each of the two reduced tripartite graphs in a direction opposite to the direction of the flow of the processing and the flow of the data.

5. The analysis apparatus according to claim 1, wherein the processor outputs, when the hash values coincide with each other, information indicating that the two source codes have no difference.

6. An analysis method, comprising:
acquiring, by a computer, two source codes of a comparison target;
generating two abstract syntax trees of the two source codes by analyzing the two source codes;
graphing, based on the respective two abstract syntax trees, a flow of processing and a flow of data in methods and between methods in the respective two source codes by performing conversion into a tripartite graph that indicates a relation of connection of a first node corresponding to the processing, a second node corresponding to reference to the data and a third node corresponding to setting of the data to generate respective two tripartite graphs each including the first node, the second node and the third node, each of the second node and the third node having an attribute value indicating an attribute of the data;
reducing, based on a given rule, one or more redundant portions of the respective graphs of the two tripartite graphed source codes;
performing comparison of the two reduced tripartite graphs and outputting a difference between the two source codes based on a result of the comparison;
first-pushing, into a stack, third nodes which contact the first node included in each of the two reduced tripartite graphs in the descending order of the absolute value of the third nodes;
hopping, from the stack, one of the third nodes when the stack is not empty;
deciding whether there exists an edge from another node toward the one of the third nodes;
adding, in a character string, a type name of the first node which contacts the one of the third nodes, the attribute value of the first node which contacts the one of the third nodes, the attribute value of the one of the third nodes, the type name of the first node which contacts the another node, the attribute value of the first node which contacts the another node and the attribute value of the another node, when deciding that the edge from the another node toward the one of the third nodes exists;
second-pushing, into the stack, third nodes which contact the first node which contacts the another node in the descending order of the absolute value of the third nodes;
repeating the hopping, the deciding, the adding, and the second-pushing until the stack becomes empty;
first-calculating a hash value of the character string when the stack becomes empty for each of the two reduced tripartite graphs; and
second-calculating the difference using the hash values for the two reduced tripartite graphs.

7. The analysis method according to claim 6, wherein one partial graph, which is included in one of the two graphs and includes at least one node, is replaced with another partial graph, which is included in the one of the two graphs and includes at least one node, to generate a partial graph, which includes the another partial graph and does not include the one partial graph, of a definition of a given method.

8. The analysis method according to claim 6, further comprising:
setting, in a set, the first node included in each of the two reduced tripartite graphs;
deciding whether the first node which contacts the another node is included in the set; and
performing the first-calculating when deciding the first node which contacts the another node is included in the set.

9. The analysis method according to claim 6, further comprising:
calculating the hash value by following each of the two reduced tripartite graphs in a direction opposite to the direction of the flow of the processing and the flow of the data.

10. The analysis method according to claim 6, further comprising:
outputting, when the hash values coincide with each other, information indicating that the two source codes have no difference.

11. A non-transitory computer-readable recording medium recording an analysis program which causes a computer to perform a process, the process comprising:
acquiring two source codes of a comparison target;
generating two abstract syntax trees of the two source codes by analyzing the two source codes;
graphing, based on the respective two abstract syntax trees, a flow of processing and a flow of data in methods and between methods in the respective two source codes by performing conversion into a tripartite graph that indicates a relation of connection of a first node corresponding to the processing, a second node corresponding to reference to the data and a third node corresponding to setting of the data to generate respective two tripartite graphs each including the first node, the second node and the third node, each of the second node and the third node having an attribute value indicating an attribute of the data;
reducing, based on a given rule, one or more redundant portions of the respective graphs of the two tripartite graphed source codes;
performing comparison of the two reduced tripartite graphs and outputting a difference between the two source codes based on a result of the comparison;
first-pushing, into a stack, third nodes which contact the first node included in each of the two reduced tripartite graphs in the descending order of the absolute value of the third nodes;
hopping, from the stack, one of the third nodes when the stack is not empty;
deciding whether there exists an edge from another node toward the one of the third nodes;
adding, in a character string, a type name of the first node which contacts the one of the third nodes, the attribute value of the first node which contacts the one of the third nodes, the attribute value of the one of the third nodes, the type name of the first node which contacts the another node, the attribute value of the first node which contacts the another node and the attribute value of the another node, when deciding that the edge from the another node toward the one of the third nodes exists;
second-pushing, into the stack, third nodes which contact the first node which contacts the another node in the descending order of the absolute value of the third nodes;

repeating the hopping, the deciding, the adding, and the second-pushing until the stack becomes empty;

first-calculating a hash value of the character string when the stack becomes empty for each of the two reduced tripartite graphs; and second-calculating the difference using the hash values for the two reduced tripartite graphs.

12. The non-transitory computer-readable recording medium according to claim 11, wherein one partial graph, which is included in one of the two graphs and includes at least one node, is replaced with another partial graph, which is included in the one of the two graphs and includes at least one node, to generate a partial graph, which includes the another partial graph and does not include the one partial graph, of a definition of a given method.

13. The non-transitory computer-readable recording medium according to claim 11, further comprising:

setting, in a set, the first node included in each of the two reduced tripartite graphs;

deciding whether the first node which contacts the another node is included in the set; and performing the first-calculating when deciding the first node which contacts the another node is included in the set.

14. The non-transitory computer-readable recording medium according to claim 11, further comprising:

calculating the hash value by following each of the two reduced tripartite graphs in a direction opposite to the direction of the flow of the processing and the flow of the data.

15. The non-transitory computer-readable recording medium according to claim 11, further comprising:

outputting, when the hash values coincide with each other, information indicating that the two source codes have no difference.

* * * * *